United States Patent
Duffield et al.

(10) Patent No.: US 7,536,455 B2
(45) Date of Patent: May 19, 2009

(54) OPTIMAL COMBINATION OF SAMPLED MEASUREMENTS

(75) Inventors: Nicholas G. Duffield, Summit, NJ (US); Carsten Lund, Berkeley Heights, NJ (US); Mikkel Thorup, Florence, MA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/488,874

(22) Filed: Jul. 18, 2006

(65) Prior Publication Data

US 2007/0016666 A1 Jan. 18, 2007

Related U.S. Application Data

(63) Continuation-in-part of application No. 10/983,346, filed on Nov. 8, 2004, and a continuation-in-part of application No. 10/056,682, filed on Jan. 24, 2002, now abandoned, and a continuation-in-part of application No. 10/056,683, filed on Jan. 24, 2002, now Pat. No. 7,080,136.

(60) Provisional application No. 60/700,585, filed on Jul. 19, 2005, provisional application No. 60/518,198, filed on Nov. 7, 2003, provisional application No. 60/300,587, filed on Jun. 22, 2001, provisional application No. 60/277,123, filed on Mar. 18, 2001.

(51) Int. Cl.
G06F 15/16 (2006.01)
(52) U.S. Cl. .................................... 709/223
(58) Field of Classification Search .................. 709/223
See application file for complete search history.

(56) References Cited

U.S. PATENT DOCUMENTS

| | | | |
|---|---|---|---|
| 5,197,002 A | 3/1993 | Spencer | |
| 6,061,331 A | 5/2000 | Conway et al. | |
| 6,119,109 A | 9/2000 | Muratani et al. | |
| 6,230,204 B1 | 5/2001 | Fleming, III | |
| 6,330,008 B1 | 12/2001 | Razdow et al. | |
| 6,347,224 B1 | 2/2002 | Smyth et al. | |
| 6,360,261 B1 | 3/2002 | Boyd et al. | |
| 6,421,435 B1 | 7/2002 | Bastien et al. | |
| 6,725,263 B1 | 4/2004 | Torres | |
| 6,735,553 B1 | 5/2004 | Frogner et al. | |
| 6,738,349 B1 | 5/2004 | Cen | |
| 6,775,267 B1 | 8/2004 | Kung et al. | |
| 6,823,225 B1 | 11/2004 | Sass | |
| 6,853,619 B1 | 2/2005 | Grenot | |
| 6,920,112 B1 | 7/2005 | McCloghrie et al. | |

(Continued)

OTHER PUBLICATIONS

Duffield, N. et al., "Learn More, Sample Less: Control Volume and Variance in Network Measurement", IEEE Trans. of Information Theory, vol. 51, No. 5, 2005.

(Continued)

Primary Examiner—David Y Eng

(57) ABSTRACT

Two regularized estimators that avoid the pathologies associated with variance estimation are disclosed. The regularized variance estimator adds a contribution to estimated variance representing the likely error, and hence ameliorates the pathologies of estimating small variances while at the same time allowing more reliable estimates to be balanced in the convex combination estimator. The bounded variance estimator employs an upper bound to the variance which avoids estimation pathologies when sampling probabilities are very small.

19 Claims, 29 Drawing Sheets

U.S. PATENT DOCUMENTS

| | | | |
|---|---|---|---|
| 6,947,723 B1 | 9/2005 | Gurnani et al. | |
| 7,058,590 B2 * | 6/2006 | Shan | 705/10 |
| 7,130,612 B1 | 10/2006 | Blewett | |
| 7,215,637 B1 | 5/2007 | Ferguson et al. | |
| 7,299,283 B1 | 11/2007 | Duffield | |
| 2002/0165958 A1 | 11/2002 | Duffield et al. | |
| 2002/0188710 A1 | 12/2002 | Duffield et al. | |

OTHER PUBLICATIONS

Duffield, N. et al., "Flow Sampling Under Hard Resource Constraints", ACM Sigmetrics 2004.

Duffield, N. et al., "Flow Sampling Under Hard Resource Constraints", [Online] 2004, Retrieved from the Internet: URL:http://www.research.att.com/~duffield/papers/DLT03-constrained.pdf.

Duffield, N. et al., "Optimal Combination of Sampled Network Measurements", Internet Measurement Conference (IMC2005), [Online] Retrieved from the Internet: URL:http://www.usenix.org/events/imc05/tech/full_papers/duffield/duffield.pdf.

Claffy, Kimberly C., et al., "Application of Sampling Methodologies to Network Traffic Characterization," Association for Computing Machinery, SIGCOMM '93, Sep. 1993, vol. 9, pp. 194-203.

* cited by examiner

FIG 19A $$\widehat{X} = \sum_{j=1}^{m} \lambda_j \widehat{X}_j \qquad (1)$$

$$v_j = \text{Var}(\widehat{X}_j) = \sum_{i=1}^{n} \text{Var}(\widehat{x}_{ij}) = \sum_{i=1}^{n} x_{ij}^2 (1 - p_{ij})/p_{ij} \qquad (2)$$

$$\mathsf{E}[\widehat{X}] = \mathsf{E}[\mathsf{E}[\widehat{X}|\underline{\lambda}]] = X \mathsf{E}[\sum_{j=1}^{m} \lambda_j] = X \qquad (3)$$

$$\text{Var}(\widehat{X}) = \sum_{j=1}^{m} \mathsf{E}[\lambda_j^2] v_j \qquad (4)$$

$$\sum_{j=1}^{m} \mathsf{E}[\lambda_i^2] v_j = \sum_{j=1}^{m} \mathsf{E}[(\lambda_j - \Lambda_j(\underline{v}))^2] v_j + V_0(\underline{v}) \qquad (5)$$

$$\Lambda_j(\underline{v}) = \frac{1/v_j}{\sum_{j'=1}^{m} 1/v_{j'}} \quad \text{and} \quad V_0(\underline{v}) = 1/\sum_{j=1}^{m} v_j^{-1} \qquad (6)$$

$$\lambda_j = \Lambda_j(\underline{v}) \qquad (7)$$

$$\lambda_j = \Lambda_j(\underline{v}) = \Lambda_j(\underline{u}) \qquad (8)$$

FIG 19B $$\widehat{v}_{ij} = \chi_{ij} x_i^2 (1 - p_{ij})/p_{ij}^2 \tag{9}$$

$$\widehat{V}_j = \sum_{i=1}^{n} \widehat{v}_{ij} \tag{10}$$

$$\lambda_j = \Lambda_j(\widehat{\underline{V}}) \tag{11}$$

$$\tau_j = \max_{i:\, p_{ij}<1} (x_i/p_{ij}) \tag{12}$$

$$\widehat{v}_{ij} \leq \chi_{ij} \tau_j^2 \tag{13}$$

$$\lambda_j = \Lambda_j(\widehat{\underline{V}}') \quad \text{where} \quad \widehat{V}_j' = \widehat{V}_j + s\tau_j^2 \tag{14}$$

$$v_{ij} \leq x_i \tau_j \tag{15}$$

$$p_{ij} = x_i/\tau_j + O((x_i/\tau_j)^2) \tag{16}$$

FIG 19C $$\widehat{X}_\pm = \widehat{X} \pm s(\widehat{V} + s\tau^2) \qquad (17)$$

$$\widehat{X} = \sum_{i=1}^{n} \chi_i x_i / p_z(x_i) = \sum_{i=1}^{n} \chi_i \max\{x_i, z\} \qquad (18)$$

$$\text{Var}(\widehat{X}) = \sum_{i=1}^{n} x_i \max\{z - x_i, 0\} \qquad (19)$$

$$\widehat{V} = \sum_{i=1}^{n} \chi_i z \max\{z - x_i, 0\} \qquad (20)$$

$$\widehat{X} = \sum_{i=1}^{n} \chi_i \max\{x_i, \widehat{z}'\} \qquad (21)$$

$$\text{Var}(\widehat{X}) = \sum_{i=1}^{n} x_i \mathsf{E}[\max\{\widehat{z}' - x_i, 0\}] \qquad (22)$$

$$\widehat{V} = \sum_{i=1}^{n} \chi_i \widehat{z}' \max\{\widehat{z}' - x_i, 0\} \qquad (23)$$

$$e'_{xy} = e_{xy} \max\{m_{xy}/M_x^{\text{in}}, m_{xy}/M_y^{\text{out}}\} \qquad (24)$$

Matrix Elements of Dataset DISTRIBUTION. Interfaces are ordered by total bytes

|   |       | 1      | 2     | 3      | 4      | 5     | 6     | 7     | 8      | 8 |
|---|-------|--------|-------|--------|--------|-------|-------|-------|--------|---|
|   |       | 0.0004 | 0.04  | 0.1    | 0.004  | 0.03  | 0.8   | 0.02  | 0      |   |
| 1 | 0     | 0      | 0     | 0      | 0      | 0     | 0     | 0     | 0      |   |
| 2 | 0.5   | 8e-05  | 0     | 0.0007 | 0      | 0     | 0.5   | 0.0001| 0      |   |
| 3 | 0.01  | 7e-05  | 0.0002| 0      | 0      | 0.001 | 0.01  | 0.0004| 0      |   |
| 4 | 0     | 0      | 0     | 0      | 0      | 0     | 0     | 0     | 0      |   |
| 5 | 0.2   | 2e-05  | 0     | 0.05   | 0.003  | 3e-05 | 0.1   | 0.006 | 0      |   |
| 6 | 0.3   | 0.0002 | 0.04  | 0.08   | 0.001  | 0.02  | 0.2   | 0.01  | 0      |   |
| 7 | 0.01  | 2e-05  | 0.003 | 0.0004 | 5e-06  | 0.006 | 0.0007| 3e-05 | 0      |   |
| 8 | 1e-06 | 1e-06  | 0     | 0      | 0      | 0     | 0     | 0     | 0      |   |

Router matrix elements for CAMPUS, with row and column sums, normalized by total bytes Estimator Comparison: input, output, router, average $_{i,o,r}$ and regular $_{i,o,r}$ for 4 matrix elements from Table 1 representing various relative volumes of the total bytes.

FIG. 23 Confidence Intervals; input, output, router, average $i,o,r$ and regular $i,o,r$ for 4 matrix elements from Table 1

Relative Errors of Matrix Elements for Different Estimators, Ranked by Size. Left: raw relative errors. Right: scaled relative errors. Top: 16 slots per interface. Middle: 128 slots per interface. Bottom: 1024 slots per interface. Note for monochrome viewing: regular $i,o,r$ is represented by lowest dark curve.

Matrix of relative errors. $k = 128$ samples per interface direction.

Left: average $_{i,o}$. Right: regular $_{i,o,r}$.

Combined estimators acting cumulatively over 100 independent estimates.

FIG 27

| threshold | adhoc | bounded | regular |
|---|---|---|---|
| $10^3$ | 0.0032 | 0.0032 | 0.0032 |
| $10^4$ | 0.0153 | 0.0133 | 0.0151 |
| $10^5$ | 0.1038 | 0.0556 | 0.0865 |
| $10^6$ | 0.4771 | 0.2802 | 0.3599 |
| $10^7$ | 6.641 | 0.7991 | 0.6476 |
| $10^8$ | 22.61 | 2.237 | 1.340 |
| $10^9$ | 74.98 | 7.449 | 3.944 |

Homogeneous Sampling. RMS relative error; 1000 flows, 10 sites

FIG. 28

| threshold | adhoc | bounded | regular |
|---|---|---|---|
| $10^3$ | 0.00003 | 0.00003 | 0.00003 |
| $10^4$ | 0.00018 | 0.00018 | 0.00018 |
| $10^5$ | 0.00103 | 0.00103 | 0.00103 |
| $10^6$ | 0.00473 | 0.00466 | 0.00473 |
| $10^7$ | 0.02014 | 0.01780 | 0.01987 |
| $10^8$ | 0.17548 | 0.09895 | 0.13683 |
| $10^9$ | 0.84820 | 0.33105 | 0.40211 |

Homogeneous Sampling. RMS relative error; 100,000 flows, 10 sites

FIG 29

| threshold | adhoc | bounded | regular |
|---|---|---|---|
| $10^3$ | 0.0017 | 0.0016 | 0.0017 |
| $10^4$ | 0.0121 | 0.0066 | 0.0117 |
| $10^5$ | 0.1297 | 0.0353 | 0.0883 |
| $10^6$ | 0.4787 | 0.1293 | 0.3267 |
| $10^7$ | 8.080 | 0.515 | 0.527 |
| $10^8$ | 46.10 | 1.464 | 0.923 |
| $10^9$ | 108.7 | 3.581 | 1.926 |

Homogeneous Sampling. RMS relative error; 1000 flows, 30 sites

FIG. 30

| threshold | adhoc | bounded | regular |
|---|---|---|---|
| $10^3$ | 0.00002 | 0.00002 | 0.00002 |
| $10^4$ | 0.00012 | 0.00012 | 0.00012 |
| $10^5$ | 0.00064 | 0.00063 | 0.00064 |
| $10^6$ | 0.00340 | 0.00321 | 0.00339 |
| $10^7$ | 0.01505 | 0.01110 | 0.01469 |
| $10^8$ | 0.16664 | 0.05400 | 0.11781 |
| $10^9$ | 0.78997 | 0.17387 | 0.37870 |

Homogeneous Sampling. RMS relative error; 100,000 flows, 30 sites

Heterogeneous Sampling Rates. RMS relative errors for adhoc, average, regular and bounded, as a function of number of estimates combined.

OPTIMAL COMBINATION OF SAMPLED MEASUREMENTS

This application is a continuation-in-part of U.S. patent application Ser. No. 10/983,346, filed on Nov. 8, 2004. This application is also a continuation-in-part of copending U.S. patent application Ser. No. 10/056,682 and U.S. patent application Ser. No. 10/056,683, now U.S. Pat. No. 7,080,136, filed concurrently on Jan. 24, 2002, and both of which claim priority to U.S. Provisional Application Ser. No. 60/277,123 ("Control Of Volume And Variance In Network Management"), filed Mar. 18, 2001 and U.S. Provisional Application Ser. No. 60/300,587 ("Charging from Sampled Network Usage"), filed Jun. 22, 2001. The 10/983,346 application also claims the benefit of U.S. Provisional Application No. 60/518,198 filed on Nov. 7, 2003. This application also claims priority to U.S. Provisional Application Ser. No. 60/700,585 filed on Jul. 19, 2005. Each of the aforementioned applications is incorporated herein by reference.

FIELD OF THE INVENTION

The present invention provides a method for sampling data flows in a data network. As will be understood by those of ordinary skill in the art, the method may be used to sample other items as well.

BACKGROUND OF THE INVENTION

Service providers of data networks are increasingly employing usage measurements as a component in customer charges. One motivation stems from the coarse granularity in the available sizes of access ports into the network. For example, in the sequence of optical carrier transmission facilities OC-3 to OC-12 to OC-48 to OC-192, each port has a factor 4 greater capacity than the next smallest. Consider a customer charged only according to the access port size. If customer's demand is at the upper end of the capacity of its current port, the customer will experience a sharp increase in charges on moving to the next size up. Moreover, much of the additional resources will not be used, at least initially. Usage based charging can avoid such sharp increases by charging customers for the bandwidth resources that they consume. Another motivation for usage-based charging stems from the fact that in IP networks the bandwidth beyond the access point is typically a shared resource. Customers who are aware of the charges incurred by bandwidth usage have a greater incentive to moderate that usage. Thus, charging can act as a feedback mechanism that discourages customers from attempting to fill the network with their own traffic to the detriment of other customers. Finally, differentiated service quality requires correspondingly differentiated charges. In particular, it is expected that premium services will be charged on a per use basis, even if best effort services remain on a flat (i.e. usage insensitive) fee.

In order to manage a data network, the service provider typically determines customer usage at routers and other network elements in order to properly bill the customer. One approach is to maintain byte or packet counters at a customer's access port(s). Such counters are currently very coarsely grained, giving aggregate counts in each direction across an interface over periods of a few minutes. However, even separate counters differentiated by service quality would not suffice for all charging schemes. This is because service quality may not be the sole determinant of customer charges. These could also depend, for example, on the remote (i.e. non-customer) IP address involved. This illustrates a broader point that the determinants of a charging scheme may be both numerous and also relatively dynamic. This observation may preclude using counts arising from a set of traffic filters, due to the requirement to have potentially a large number of such filters, and the administrative cost of configuring or reconfiguring such filters.

A complementary approach is to measure (or at least summarize) all traffic, and then transmit the measurements to a back-office system for interpretation according to the charging policy. In principle, this could be done by gathering packet headers, or by forming flow statistics. An IP flow is a sequence of IP packets that shares a common property, as source or destination IP address or port number or combinations thereof. A flow may be terminated by a timeout criterion, so that the interpacket time within the flow does not exceed some threshold, or a protocol-based criterion, e.g., by TCP FIN packet. Flow collection schemes have been developed in research environments and have been the subject of standardization efforts. Cisco NetFlow is an operating system feature for the collection and export of flow statistics. These include the identifying property of the flow, its start and end time, the number of packets in the flow, and the total number of bytes of all packets in the flow.

The service provider of a data network also typically collects data regarding data usage over the data network as well as parts of the data network. The collection of network usage data is essential for the engineering and management of communications networks. Until recently, the usage data provided by network elements has been coarse-grained, typically comprising aggregate byte and packet counts in each direction at a given interface, aggregated over time windows of a few minutes. However, these data are no longer sufficient to engineer and manage networks that are moving beyond the undifferentiated service model of the best-effort Internet. Network operators need more finely differentiated information on the usage of their network. Examples of such information include (i) the relative volumes of traffic using different protocols or applications; (ii) traffic matrices, i.e., the volumes of traffic originating from and/or destined to given ranges of Internet Protocol (IP) addresses or Autonomous Systems (AS); (iii) the time series of packet arrivals together with their IP headers; (iv) the durations of dial-user sessions at modem banks. Such information can be used to support traffic engineering, network planning, peering policy, customer acquisition, marketing and network security. An important application of traffic matrix estimation is to efficiently redirect traffic from overloaded links. Using this to tune OSPF/IS-IS routing one can typically accommodate 50% more demand.

Concomitant with the increase in detail in the information to be gathered is an increase in its traffic volume. This is most noticeable for traffic data gathered passively, either by packet monitors gathering IP packet header traces or IP flow statistics. As an example, a single OC-48 at full utilization may yield as much as 70 GB of IP packet headers or 3 GB of flow statistics per hour. The volume of data exported for further analysis may be potentially decreased at the measurement point through either filtering or aggregation. Neither of these approaches may be appropriate for all purposes. Filtering allows us to restrict attention to a particular subset of data, e.g., all traffic to or from a pre-determined range of IP addresses of interest. However, not all questions can be answered in such a manner. For example, in determining the most popular destination web site for traffic on a given link, one generally does not know in advance which address or address ranges to look for. On the other hand, aggregation and other forms of analysis at the measurement site have two disadvantages. First, the time-scale to implement and modify such features in network elements are very long, typically a small number of years. Second, the absence of raw measured data would limit exploratory studies of network traffic.

With increasing data usage that is driven for the explosive demand for data services, a data network must support greater data traffic. Consequently, the data network must generate more data and associated messaging for managing the data network. A method that ameliorates the generation of management-related messaging and data while preserving the capabilities of managing the data network is therefore of great benefit to the industry.

BRIEF SUMMARY OF THE INVENTION

The present invention provides a method for sampling data flows in a data network in order to estimate a total data volume in the data network. Sampling the data flows in the data network reduces the network resources that must be expended by the network in order to support the associated activities. The present invention enables the service provider of the data network to control sampling volumes in relation to the desired accuracy. (In the disclosure "sampling volume" is defined as a number of objects selected as the result of sampling, e.g. during a sampling window. It may be a pure number, or may be expressed as a rate, i.e. number of objects per unit time.) The control can be either static or can be dynamic for cases in which the data volumes are changing as a function of time. Moreover, the present invention is not dependent upon the underlying statistical characteristics of the data flows.

The disclosure presents an exemplary embodiment with two variations. The exemplary embodiment comprises a data network with a network of routers and dedicated hosts for managing the data network. The first variation enables the service provider to charge a customer for usage of a data network. The method utilizes the sampling of flows that are associated with the customer. The contribution to the usage by a sampled flow is normalized by a number that reflects the probability of sampling. The usage can be adjusted by the service provider in order to compensate for a possibility of overcharging. In addition, the method enables the service provider to adjust the sampling rate and the billing period to reduce undercharging in accordance with the goals of the service provider. The second variation enables the service provider to manage a data network in accordance with the measured traffic volume. The service provider can adjust the sampling volume in accordance with the measured sampling volume and with the desired accuracy for both static and dynamic situations.

In one embodiment, the invention comprises a method and apparatus for sampling at least one object from a plurality of objects. Specifically, the method comprises receiving a plurality of objects, each of the objects comprising at least one attribute, computing a sampling parameter for each of the objects using the at least one attribute, wherein the sampling parameter is derived in accordance with a random variable that is generated for each of the objects; and selecting at least one object from the plurality of objects according to at least one of the sampling parameters.

In another embodiment of the invention, a method of estimating a property of items comprises obtaining a first sample of said items based on a first sampling distribution, obtaining a first estimate of said property based on said first sample, obtaining a second sample of said items based on a second sampling distribution, said second distribution different from said first distribution, obtaining a second estimate of said property based on said second sample, determining a lower bound for a variance of each of the samples, and combining the samples using a variance value for each sample that is equal to or larger than the lower bound for the variance for the said sample.

BRIEF DESCRIPTION OF THE DRAWINGS

FIGS. 19A, 19B and 19C is a Table of equations relating to embodiments of the invention.

FIG. 27 is a table of homogeneous sampling with RMS relative error; 1000 flows, 10 sites.

FIG. 28 is a table of homogeneous sampling with RMS relative error; 100,000 flows, 10 sites.

FIG. 29 is a table of homogeneous sampling with RMS relative error; 1000 flows, 30 sites.

FIG. 30 is a table of homogeneous sampling with RMS relative error; 100,000 flows, 30 sites.

DETAILED DESCRIPTION OF THE INVENTION

One limitation to comprehensive direct measurement of traffic stems from the immense amounts of measurement data generated. For example, a single optical carrier transmission facility OC-48 at full utilization could generate about 100 GB of packet headers, or several GB of (raw) flow statistics each hour. The demands on computational resources at the measurement point, transmission bandwidth for measured data, and back-end systems for storage and analysis of data, all increase costs for the service provider.

A common approach to dealing with large data volumes is to sample. A common objection to sampling has been the potential for inaccuracy; customers can be expected to be resistant to being overcharged due to overestimation of the resources that they use.

Figure 1:
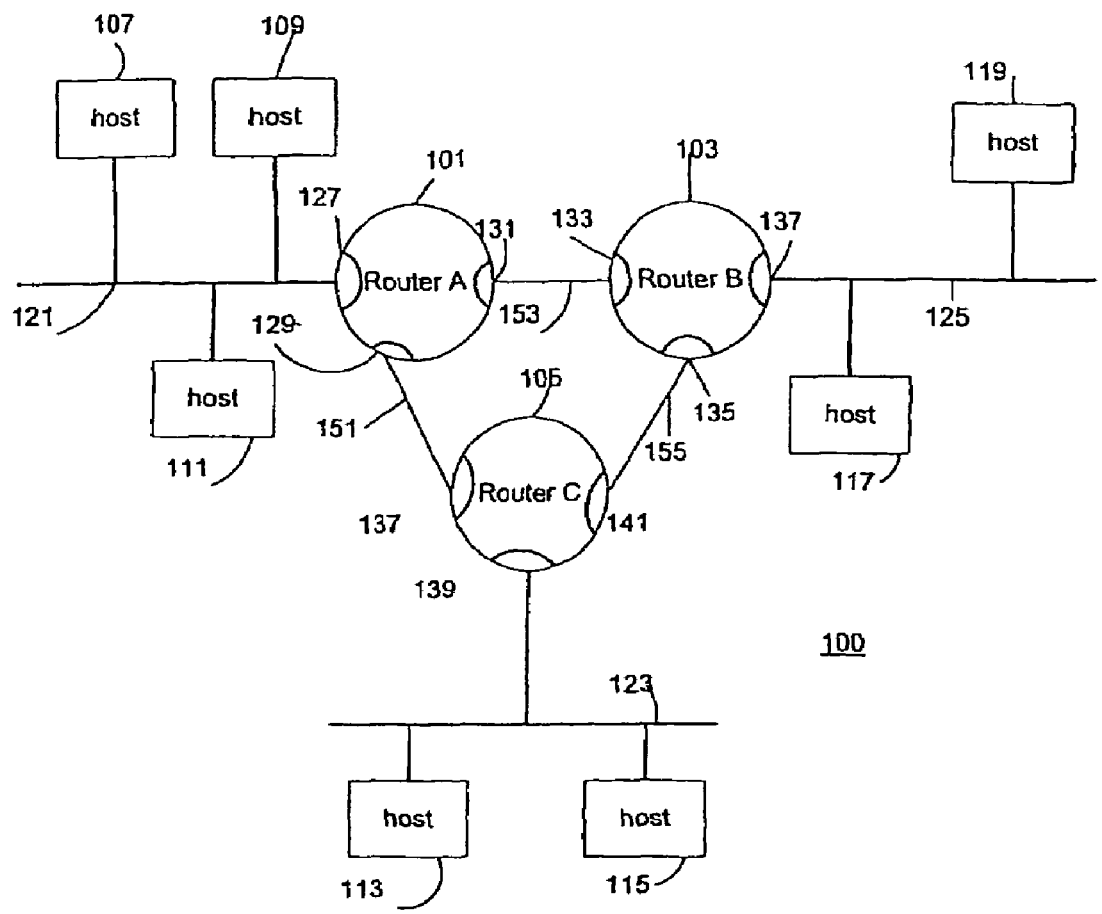
FIG. 1 illustrates a data network utilizing size-dependent sampling, in accordance with the present invention.

FIG. 1 illustrates data network 100 that utilizes size-dependent sampling in accordance with the present invention. In the exemplary embodiment of the invention, data network 100 supports Internet Protocol (IP) messaging for the users (customers) of host 107, 109, 111, 113, 115, 117, and 119. (However, variations of the embodiment can support other data protocols.) A host includes PCs, workstations, mainframes, file servers, and other types of computers. Hosts 107, 109, and 111 are configured on data link 121; hosts 113 and 115 are on data link 123; and hosts 117 and 119 are configured on data link 125. In order for a host (e.g. host 111) to communicate to another host (e.g. host 119) on a different data link, IP messaging is routed through routers 101, 103, and 105 and data links 151, 153, and 155. A router forwards packets between hosts and other routers in order to enable hosts not connected to the same link to communicate. Each router has a port (e.g. 127, 129, and 131) for router 101 that connects to a data link. Similarly, ports 133, 135, and 137 correspond to router 103, and ports 137, 139, and 141 correspond to router 105.

In the exemplary embodiment, host 113 supports the billing (charging) of customers and host 115 supports the collection and the utilization of data traffic information regarding data transmission for data network 100. Hosts 107, 109, 111, 117, and 119 correspond to users who are the customers for the service provider operating data network 100. Managing functions that are associated with the billing of customers and the traffic management support the collection of relevant information for the management of data network 100. (In the disclosure, "managing a network" denotes the determination of one or more characteristics of the configuration, state, and/or usage of the network and its management subsystems. The characteristics are then reported for subsequent activities such as billing or marketing, and/or using them to assist reconfigure and/or reengineer the network and its management subsystems.) Host 113 collects information from routers 101, 103, and 105 about customer usage. Host 115 collects information about data traffic over the data links. With a typical data network, many flows are transported over the data network. Generating management-related messages to hosts 113 and 115 can be very detrimental to the performance of data network 100 if the number of messages is large. Thus, sampling is supported by data network 100 in order to reduce the number of management-related messages to reduce any associated performance degradations.

With alternative embodiments, a router (e.g. 101, 103, and 105) collects information about data traffic over data links through the router. Utilizing the information, the router can adjust its configuration for the current data traffic.

The present invention provides a sampling mechanism that specifically addresses concerns of sampling error. Total customer usage is the sum of a number of components, some large, some small. Sampling errors arise predominantly from omission of the larger components, whereas accuracy is less sensitive to omission of the smaller components. For example, consider a simple sampling scheme in which one estimates the total bytes of usage by sampling 1 in every N flows, and then adds together N times the total bytes reported in each sampled flow. The underlying distribution of flow bytes sizes has been found to follow a heavy tailed distribution. In this case, the estimate can be extremely sensitive to the omission or inclusion of the larger flows. Generally, such an estimator can have high variance due to the sampling procedure itself. (In the disclosure, the term "flow" is used synonymously with the term "object.")

The present invention does not require any knowledge of the underlying statistical information of the data traffic for data network 100. For example, the associated probability relating to the size of a flow can assume any form, including a heavy-tailed probability distribution. A flow (object) comprises at least one unit of data (e.g. packet, byte, octet, and ATM cell).

Additionally, the present invention reduces sampling volumes for data network 100. A heavy-tailed distribution of flow sizes can be turned to an advantage for sampling provided an appropriate sampling algorithm is used. The present invention utilizes size-dependent sampling, in which an object of size x is selected with some size dependent probability $p(x)$. The probability $p(x)$ is 1 for large x. In the case of flows, all sufficiently large flows will always be selected; there is no sampling error for such flows. On the other hand one can have $p(x)<1$ for smaller flows; this reduces the number of samples, but the error involved is small since the underlying flows are small. To estimate the total bytes represented in the original set of flows, one sums the quantities $x/p(x)$ over only the sampled flows. Applying the renormalization factor $1/p(x)$ to the small flows compensates for the fact that that might have been omitted. In fact, it can be shown that this sum is an unbiased estimator of the actual total bytes (i.e. its average value over all possible random samplings is equal to the actual total bytes. Moreover, uniform sampling is a special case of this scheme with $p(x)$ constant and equal to $1/N$.)

With the exemplary embodiment of the invention (as shown as data network 100 in FIG. 1), routers 101, 103, and 105 sample objects (flows). Consequently, routers 101, 103, and 105 send messages ("samples") to host 113 (corresponding to charging the customer for usage) and to host 115 (corresponding to determining traffic volume) comprising attributes of the sampled object (e.g. the customer's identification) and the size of the object. Alternative embodiments may store corresponding data at routers 101, 103, and 105 for later processing or may utilize intervening processors between routers 101, 103, and 105.

Size-dependent sampling has a number of advantages. First, the sampling probabilities $p(x)$ can be chosen to satisfy a certain optimality criterion for estimator variance as described later. Second, a simple adaptive scheme allows dynamic tuning of $p(x)$ in order to keep the total number of samples within a given bound. Thus, in the context of flow measurement, the number of flow statistics that are transmitted to the back-end system (host 113 and host 115) can be controlled by the service provider. Third, on binding the sampling parameters (i.e. p(x)) to the data x in constructing the rescaled size x/p(x), the need to keep independent track of p(x) (or even the original flow sizes x) is obviated. Thus, p(x) can vary at different times and across different regions of the network (as needed), but estimation remains unbiased. Fourth, sampling is composable in the sense that the first three properties above are preserved under successive resampling. Thus, one could progressively resample at different points in the measurement system in order to limit sample volumes. Also, size-dependent sampling is applicable to packet sampling as well. However, one expects the performance benefit over 1 in N sampling to be smaller in this case, since packet sizes do not have a heavy-tailed distribution.

The present invention utilizes an approach to usage-sensitive charging that mirrors the foregoing approach to sampling. The sampling scheme determines the size of the larger flows with no error. Estimation error arises entirely from sampling smaller flows. For billing purposes we wish to measure the total bytes for each billed entity (e.g. for each customer at a given service level) over each billing cycle. Larger totals have a smaller associated sampling error, whereas estimation of total bytes for the smallest customers may be subject to greater error. Therefore, the service provider sets a level L on the total bytes, with a fixed charge for all usage up to L, then a usage sensitive charge for all usage above L. Thus, the service provider only needs to tune the sampling scheme for estimating the usage above L within the desired accuracy.

Moreover, the potentially massive volumes of data to be gathered have important consequences for resource usage at each stage in the chain leading from data collection to data analysis. First, computational resources on network elements are scarce, and hence measurement functions may need to be de-prioritized in favor of basic packet forwarding and routing operations, particularly under heavy loads. Second, the transmission of raw measurement data to collection points can consume significant amounts of network bandwidth. Third, sophisticated and costly computing platforms are required for the storage and analysis of large volume of raw measurement data.

The present invention utilizes sampling as a means to reduce data volume while at the same time obtaining a representative view of the raw data. An elementary way to do this is to sample 1 in N raw data objects, either independently (i.e. each object is selected independently with probability 1/N) or deterministically (objects N, 2N, 3N, . . . are selected and all others are discarded). Only those selected objects are used further for analysis. This sampling strategy clearly reduces the load associated with the subsequent transmission, storage, and analysis of the data by a factor N.

However, besides the ability to reduce data volumes, the statistical properties of any proposed sampling scheme must be evaluated. The sampling parameters (N in the above example) need to be bounded to the sampled data in order that extensive properties of the original data stream can be estimated. For example, to estimate the bytes rate in a raw packet stream from samples gathered through 1 in N sampling, one needs to multiply the byte rate of the sampled stream by N. Under a given constraint on resources available for measurement transmission or processing of data, N may vary both temporally and spatially according to traffic volumes. Hence, N is not typically a global variable independent of the raw data.

Although one expects random sampling to yield unbiased estimates of properties of the typical raw data objects, there may be a significant impact of the variance of such estimates. A striking feature of flow statistics is that the distributions of the number of packet and bytes in flows are heavy-tailed. Consider the problem of reducing reported flow export volumes by sampling 1 in every N flow statistics. Sampling from heavy tailed distributions is particularly problematic, since the inclusion or exclusion of a small number of data points can lead to large changes in estimates of the mean. This has the consequence that estimates of the total byte rates on a link using a subset of flows selected by 1 in N sampling can be subject to high variance due to the sampling procedure itself. A sampling strategy that samples all big flows and a sufficient fraction of the smaller flows may reduce the estimator variance.

The basis of the sampling scheme is that sufficiently large objects (that may comprise packets or asynchronous transfer mode cells) are always sampled, while smaller objects are sampled with progressively smaller probability. A set of objects (flows) are labeled by i=1, 2, . . . , n corresponding to summaries generated by measurements in the network during some time period. Let $x_i$ be the size attribute of interest from the flow i, e.g., the number of packets in the flow, or the total number of bytes in the flow, or any other positive quantity of interest. Each packet in a flow possesses a common attribute, such as IP address (or net), port number, or Type of Service (ToS) field. Each combination of interest corresponds to attributes as referred by a "color"; $c_i$ will be the color of flow i. In the context of billing, a color might correspond to a customer address, or this plus a remote network, and possibly a ToS specification. The mapping that associates a particular customer with a set of packet attributes may be relatively complex. This to be performed by the subsystem that collects and interprets the measurements (e.g. hosts 113 and 115 in the exemplary embodiment). The objective is to estimate the totals for each color c of interest as follows.

$$X(c) = \sum_c x_i \qquad (1)$$

The present invention supports the sampling of raw packet headers, the set of flow statistics formed from the sampled packets, the stream of flow statistics at some intermediate aggregation point, and the set of aggregate flows at the collection point. The knowledge of the number n of original objects is not required. Furthermore, sampling itself need not make reference to the object color c. This reflects the fact that the colors of interest may not be known at the time of sampling and that it is infeasible to simply accumulate sizes from the original stream for all possible colors.

Figure 2:
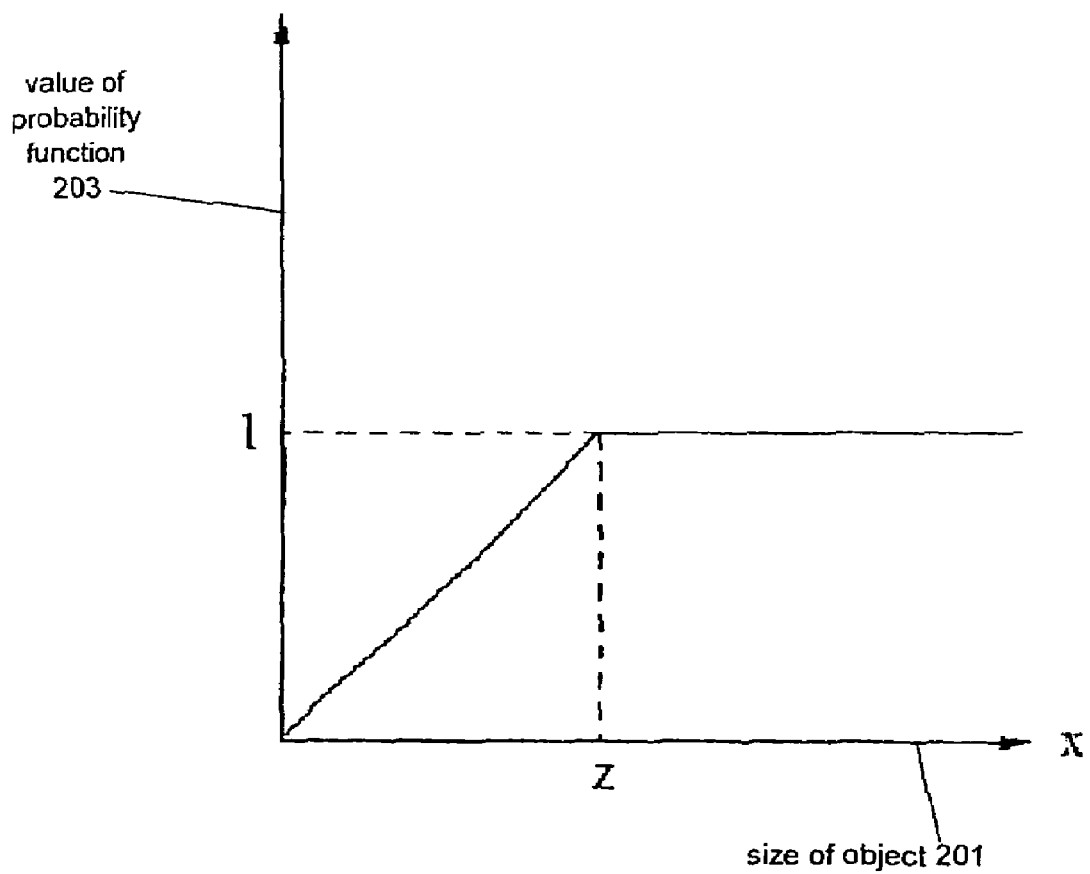
FIG. 2 shows a sampling probability function.

For each positive number z, one defines the sampling probability function $p_z(x)=\min\{1,x/z\}$. In the sampling scheme, a flow with size x is sampled with probability $p_z(x)$. The parameter z acts as a threshold: flow of size z or above are always sampled as shown in FIG. 2. The horizontal axis corresponds to $x_i$ (the size of an object 201). (In the disclosure, the parameter z is an example of a "probabilistic parameter.") Each independent random variable $w_i$ has the values 1 with probability $p_z(x_i)$ and 0 otherwise. Thus $w_i$ indicates whether flow i is to be sampled ($w_i=1$) or not ($w_i=0$). Each sampled value $x_i$ is renormalized by division by $p_z(x_i)$. Thus, the estimate of the X (c) is given by:

$$\hat{X}(c) = \sum_c w_i x_i / p_z(x_i) \qquad (2)$$

In order to manage data network 100, the statistical variability of the estimate of X(c) provides a measure of confidence of the estimate. Moreover, the present invention enables the service provider to "tune" the operation of data network 100 in order to achieve the desired accuracy. In fact, $p_z(x_i)$ is optimal in the sense that Var $\hat{X}(c)+z^2 E(N(c))$ is minimized with $p_z(x_i)$, where E(N(c)) is the expected value of N(c). As will be explained later, the disclosure provides a method for controlling the statistical variance based upon operating parameters that the service provider can control. Parameter z is the size threshold above which flows are always sampled. The larger the value of z, the less likely that a given flow will be sampled and consequently the greater the variance associated with sampling it. If z is small, then Var $\hat{X}(c)+z^2 E(N(c))$ is more easily minimized by making Var $\hat{X}(c)$ small, which occurs if one samples more of the flows. Conversely, if z is large, then Var $\hat{X}(c)+z^2 E(N(c))$ is more easily minimized by making E(N(c)) small, which occurs if one samples less of the flows.

Figure 3:
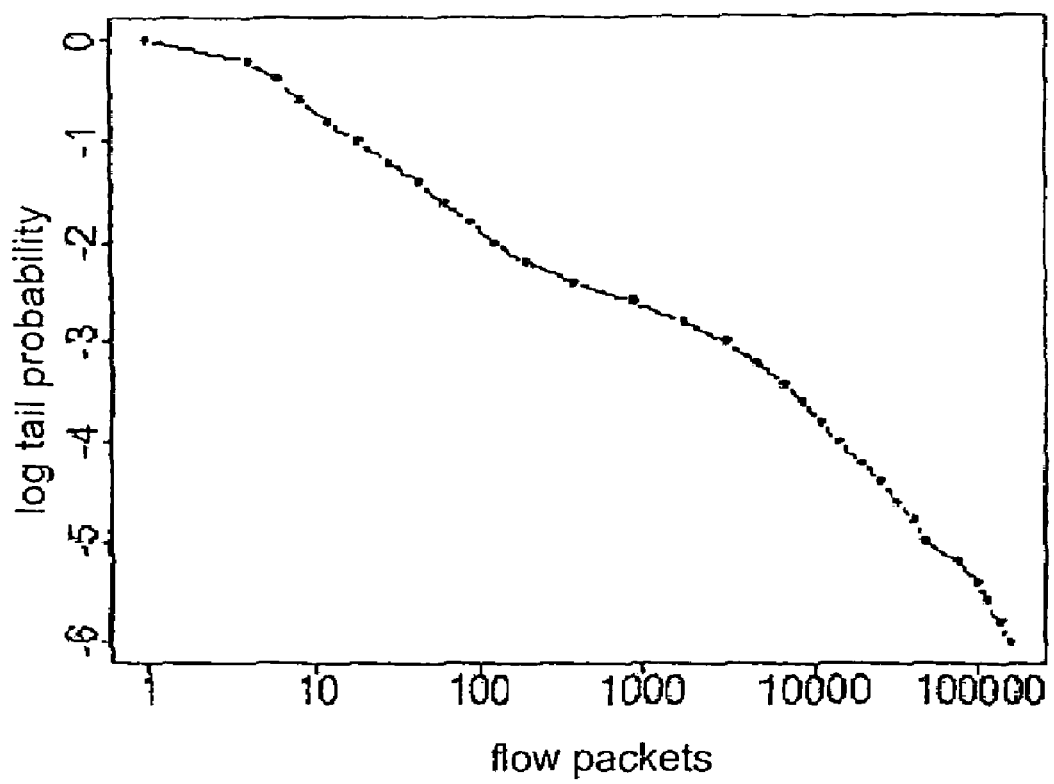
FIG. 3 shows a complementary cumulative distribution (CCDF) of flow byte sizes.
Figure 4:
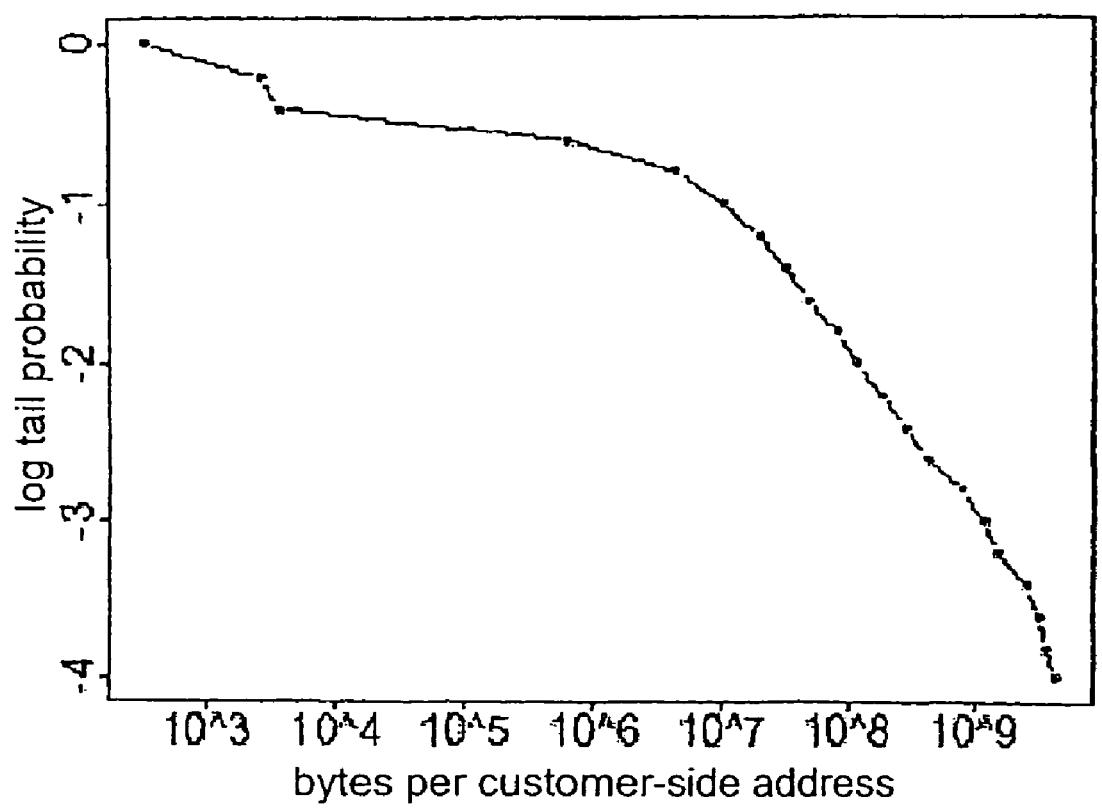
FIG. 4 shows a complementary cumulative distribution (CCDF) of bytes per customer-side IP addresses.

Data networks supporting IP (as in data network 100) typically encounter heavy-tailed distributions of byte and packet sizes of IP. FIG. 3 displays an exemplary complementary cumulative distribution function (CCDF), i.e. the proportion of flows with bytes greater than a given level, of the flow sizes encountered by data network 100. The approximate linearity on the log-log scale is indicative of a heavy tailed distribution. The distribution of total bytes per customer-side IP address over a given period shares the heavy tailed property as shown in FIG. 4.

A statistic for comparing estimated usage with its actual usage is quantified by the Weighted Mean Relative Error (WMRE).

$$WMRE = \frac{\sum_c |\hat{X}(c) - X(c)|}{\sum_c X(c)} \qquad (3)$$

The WMRE averages the per-color absolute relative errors. WMRE gives greater weight to relative errors for large volume colors than for those with small volumes.

Figure 5:
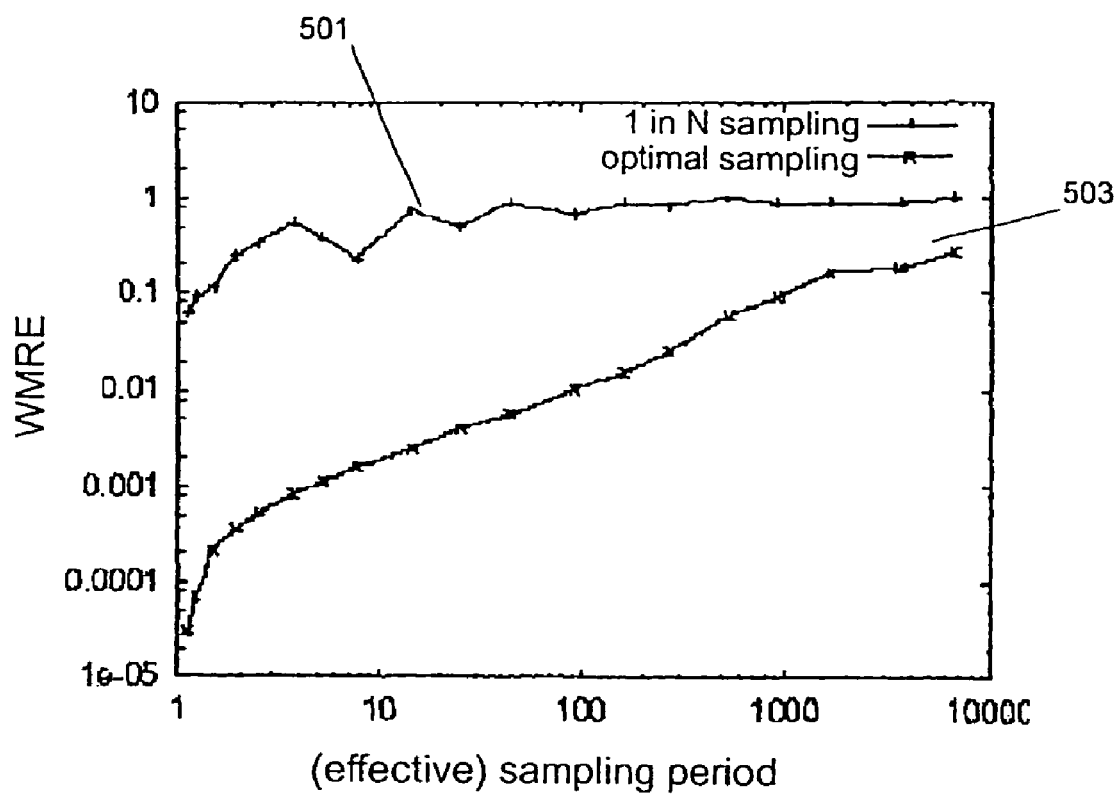
FIG. 5 shows an example of weighted mean relative error vs. an effective sampling period.

FIG. 5 illustrates an example of substantially better accuracy (smaller WMRE) of optimal sampling as compared with 1 in N sampling, over 4 orders of magnitude of the sampling period. Curve 501 illustrates the relationship for WMRE as a function of the effective sampling period, while curve 503 shows the corresponding relationship with sampling as described in the disclosure. With an effective sampling period of 100, the WMRE for optimal sampling is about only 1%, while for 1 in N sampling it is around 50%. The irregularity of the upper line reflects the sensitivity of the estimates from 1 in N sampling to random inclusion or exclusion of the largest flows during sampling. These features demonstrate the potential for inaccuracy arising from naive sampling from heavy-tailed distributions.

Figure 6:
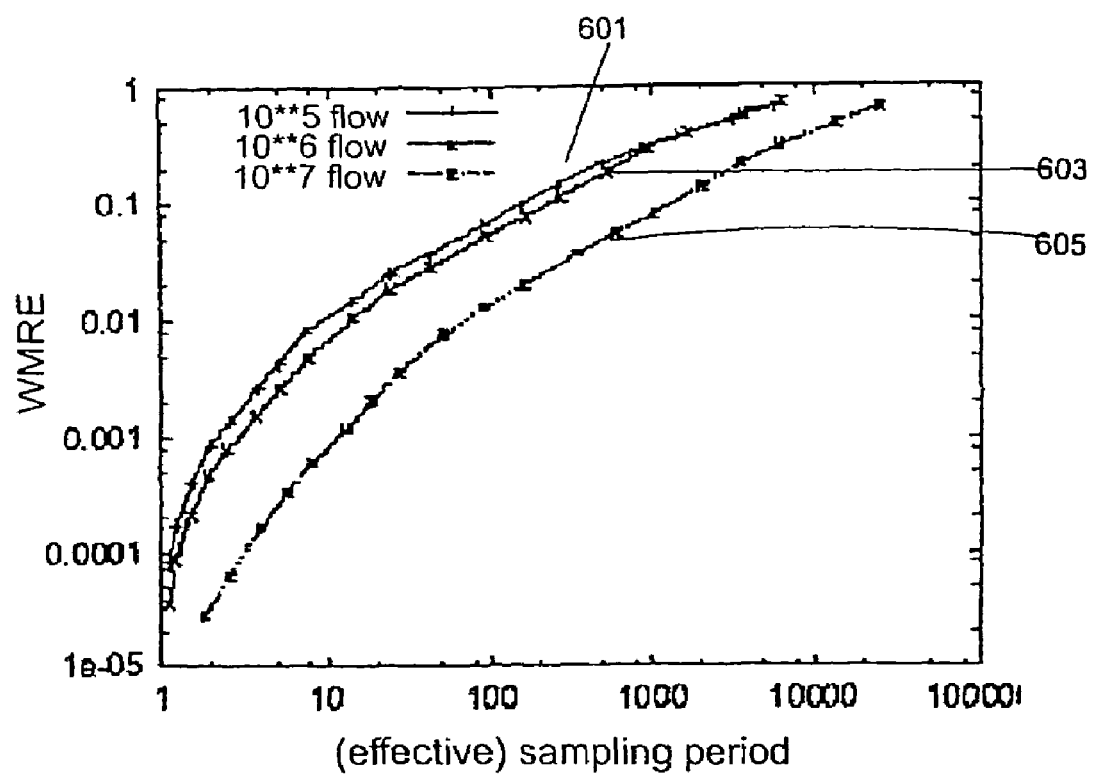
FIG. 6 shows an example of weighted mean relative error vs. an effective sampling period for different flow sizes.

FIG. 6 displays with WMRE vs. sampling period for a trace of $10^7$ flows (corresponding to curve 605), as compared with subportions contain $10^6$ (corresponding to curve 603) and $10^5$ (corresponding to curve 601) flows. The relative error decrease as the trace length increases, since the byte total for a given IP address is composed of a greater number of contributions. It may be desirable to place lower bounds on z in order to fulfill other objectives, such as limiting the rate at which samples are generated. The behavior from FIG. 6 suggests that is possible to simultaneously fulfill the goal of low relative error provided that the length of the period of observation (e.g. the billing period) is sufficiently long.

The exemplary embodiment utilizes the disclosed sampling techniques for charging the customer of data network 100 for usage. Fair charging requires that the deviation between the traffic charged to a customer and the actual traffic be kept to a minimum. The scheme is essentially the best possible, in the sense that variance of $\hat{X}$ is minimized for a given threshold z. However, the relative estimation error can be relatively large for colors with small amounts of traffic. As an extreme example, suppose the traffic associated with color c has total size X(c)<z. Each flow in that traffic thus has size less than z and will hence have a contribution to the estimate $\hat{X}(c)$ that is either 0 (if the flow is not sampled), or z (if it is sampled, wherein the sample is normalized by $p_z(x)$). Hence, $\hat{X}(c)$ will be either 0, or at least z.

As a simple solution to the problem of estimating the small traffic volumes, the service provider can charge the traffic of a given color at a fixed fee, plus a usage-sensitive charge only for traffic volumes that exceed a certain level L. (L may depend on the color in question). The idea is to tune the sampling algorithms so that any usage X(c) that exceeds L can be reliably estimated. Usage X(c) that falls below L does not need to be reliably estimated, since the associated charge is usage-insensitive, i.e., independent of $\hat{X}(c)$<L.

Generally, one can consider traffic to be charged according to some function $f_c(\hat{X}(c))$ which depends on $\hat{X}(c)$ only through the quantity max{$\hat{X}(c)$, L}, i.e., it is independent of any usage below L. The subscript of $f_c$ indicates that the charge may depend on the color c, e.g., through the type of service, or foreign IP address. In the exemplary embodiment, the service charges the customer according to:

$$f_c(\hat{X}(c)) = a_c + b_c \max\{\hat{X}(c), L\} \qquad (4)$$

where "$a_c$" is a fixed charge, than can encompass, e.g., port charges and administrative charges, "$b_c$" is a per byte charge on traffic transmitted during the billing cycle, and "L" is the minimum usage. Equation 4 can also express pricing models in which there is a fixed administrative charge for small customers, whose usage doesn't warrant accurate measurement. Both $a_c$ and $b_c$ are allowed to depend on the color c in question.

Reliable estimation of the volumes X(c) is determined by choosing the sampling threshold z appropriately high for level L in question. The larger the level L and the larger the deviation of $\hat{X}(c)$ from X(c) that can be tolerated, the higher a sampling level z one can allow.

The variance of all estimates for $\hat{X}(c)$ greater than the level L can be controlled. This corresponds as a condition on the standard error, i.e., the ratio of standard deviation $\sigma(\hat{X}(c))$=sqrt(Var $\hat{X}(c)$) to the mean X(c). In the exemplary embodiment, the typical estimation error is no more than about $\epsilon$ times X, for some target $\epsilon$>0. This can be expressed this as the following standard error condition:

$$\sigma(\hat{X}(c)) < \epsilon X(c) \text{ if } X(c) > L \qquad (5)$$

For example, with $\epsilon$=0.05 the standard deviation cannot be more than 5% of the mean.

If $\hat{X}(c)$ is derived from a large number of flows of independent sizes then $\hat{X}(c)$ is roughly normally distributed. From Equation 5, the probability of overestimating $\hat{X}(c)$>L by an amount $\delta X(c)$ (i.e., by $\delta/\epsilon$ standard deviations) is no more than $\phi(-\delta/\epsilon)$, where $\phi$ is the standard normal distribution function. Thus, with $\epsilon=0.05$, the probability of overestimating $\hat{X}(c)$ by more than 10% (corresponding to $\delta$) is approximately equal to $\phi(-2)=2.23\%$ (since $10\%=2\times5\%$).

The above approach sets limits on the chance that the deviation of the estimated usage above the actual usage exceeds a given amount. A refinement allows the service provider to set a limit on the chance that overcharging occurs. This should be more attractive from the customer's point of view since the chance of the customer being over billed at all can be small. Conversely, the service provider has to accept a small persistent under billing in order to accommodate the potential sampling error.

The distribution of $\hat{X}(c)$ can be well approximated by a normal distribution when it is derived from a large number of constituent samples. If the probability of $\hat{X}(c)$ being at least s standard deviations above the expected value $X(c)$ is sufficiently small, then the calculated usage can be adjusted as follows:

$$\hat{X}'(c)=\hat{X}(c)-s\sqrt{z\overline{X(c)}} \qquad (6)$$

"s" is the number of standard deviations away from $X(c)$ above which over-estimation is sufficiently rare. As an example, with $s=3$, $\phi(-s)$ is about 0.13%, i.e. about 1 in 740 traffic volumes will be overestimated.

The service provider may charge according to $\hat{X}'(c)$ rather than $\hat{X}(c)$. In such a case, the customer is billed $f_c(\hat{X}'(c))$. Thus, the chance that the customer is over billed is approximately equal to $\phi(-s)$.

For the service provider, the difference $\hat{X}(c)-\hat{X}'(c)=s\sqrt{z\overline{X(c)}}$ represents unbillable revenue. In the charging scheme (as in Equation 4), this leads to under billing by a fraction roughly $s\sqrt{z/X(c)}$. Given the minimum billed volume L, the fraction of underbilling is no more than $s\sqrt{z/L}$. (In variations of the exemplary embodiment, underbilling can be systematically compensated for in the charging rate $b_c$.) Thus, in order to limit potential undercharging to a fraction of no more than about $\eta$, the service provider determines $s^2z<\eta^2L$. In the example of $s=3$, underbilling by a fraction of no more than $\eta=10\%$ then requires selecting z and L such that z is less than about L/1000.

Table 1 shows the tradeoff of overcharging and unbillable usage.

TABLE 1

TRADE-OFF BETWEEN OVERCHARGING AND UNBILLABLE TRAFFIC

| | Unbillable usage | overcharged customers |
|---|---|---|
| s = 0 | −.1% | 50% |
| s = 1 | 3.1% | 3% |
| s = 2 | 6.2% | 0 |

Consider flows that present themselves for sampling at a rate $\rho$, in which the flow sizes have a distribution function F, i.e., $F(x)$ is the proportion of flows that have size less than or equal to x. With a sampling threshold z, samples are produced at an average rate $r=\rho\int F(dx)p_z(x)$. Suppose there is a target maximum rate of samples $r^*<\rho$. Then the service provider determines the sampling threshold z such that $\rho\int F(dx)p_z(x)<r^*$. Using the fact that $p_z(x)$ is a decreasing function in z, it can be shown that this observation requires $z\geq z^*$, where $z^*$ is the unique solution z to the equation $\rho\int F(dx)p_z(x)=r^*$.

Let $z_o$ denote the maximum sampling threshold allowed in order to control sampling variance, e.g., $z\leq z_o=\epsilon^2L$. The goals of controlling sample volume and variance are compatible provided that $z^*\leq z_o$, for then any sampling threshold z in the interval $[z^*, z_o]$ has the property of being sufficiently small to yield small sampling variance, and sufficiently large to restrict the average sampling rate no greater than the desired rate $r^*$.

The condition $z^*\leq z_o$ can be realized by increasing the length of the billing cycle. The thresholds $z_o$ and $z^*$ control phenomena at different timescales. $z^*$ controls the average rate at which samples are taken. On the other hand, $z_o$ controls the sampling variance of the estimates $\hat{X}(c)$ of total bytes over the billing timescale, potentially over days, weeks, or even months. The level byte L (under which accurate measurements are not needed) can be chosen to increase with the billing timescale. For example, the service provider may choose L to correspond to a particular quartile of the distribution of byte size, so that only a given proportion of the total bytes transmitted on the network are generated by customers whose total usage does not exceed L during the billing cycle. Increasing the length of the billing cycle will increase the corresponding quartile L, and hence also $z_o$ since is proportional to L. Support for this approach is provided by FIG. 6, which shows that the relative error in estimation decreases as the duration of collection of the flow trace increases.

Figure 7:
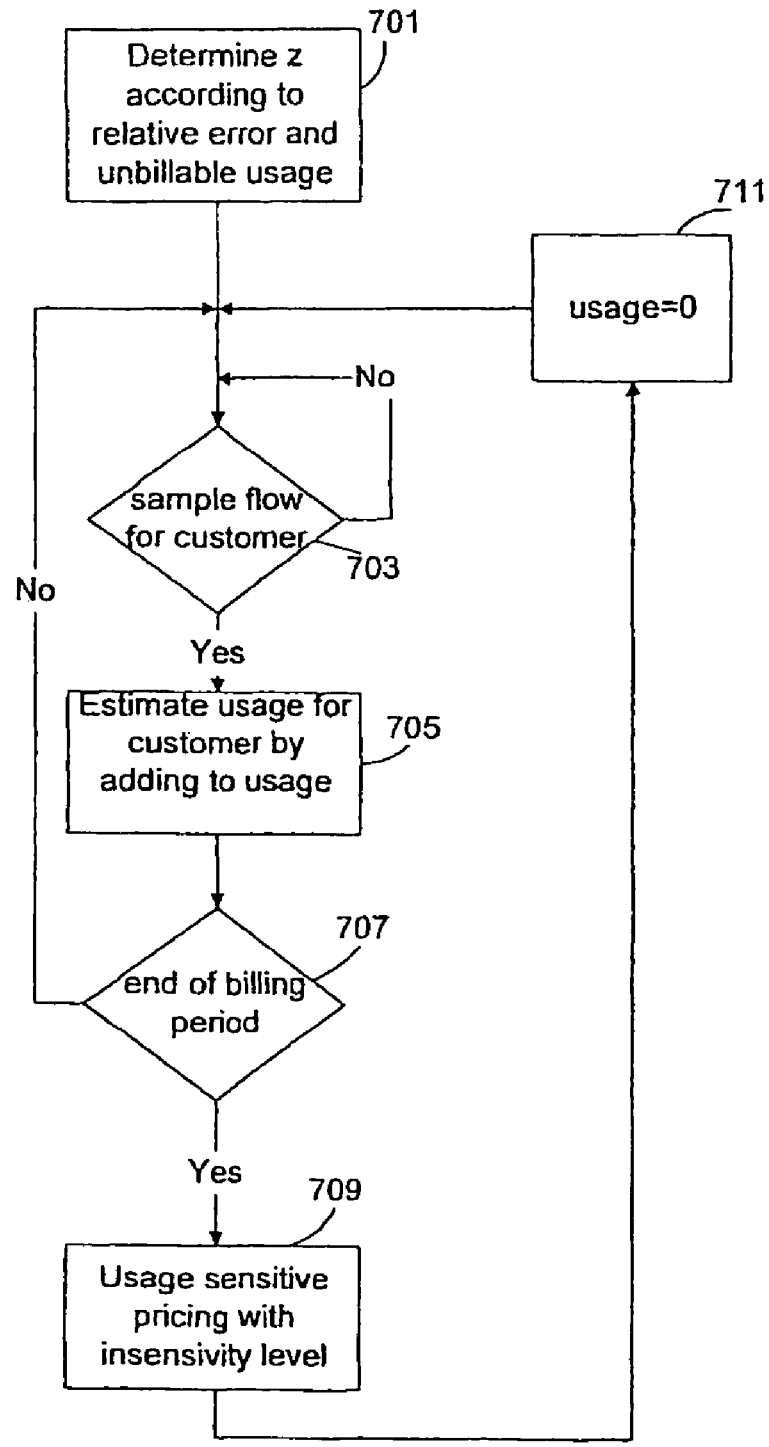
FIG. 7 is a flow diagram for charging with sampled network usage.
Figure 11:
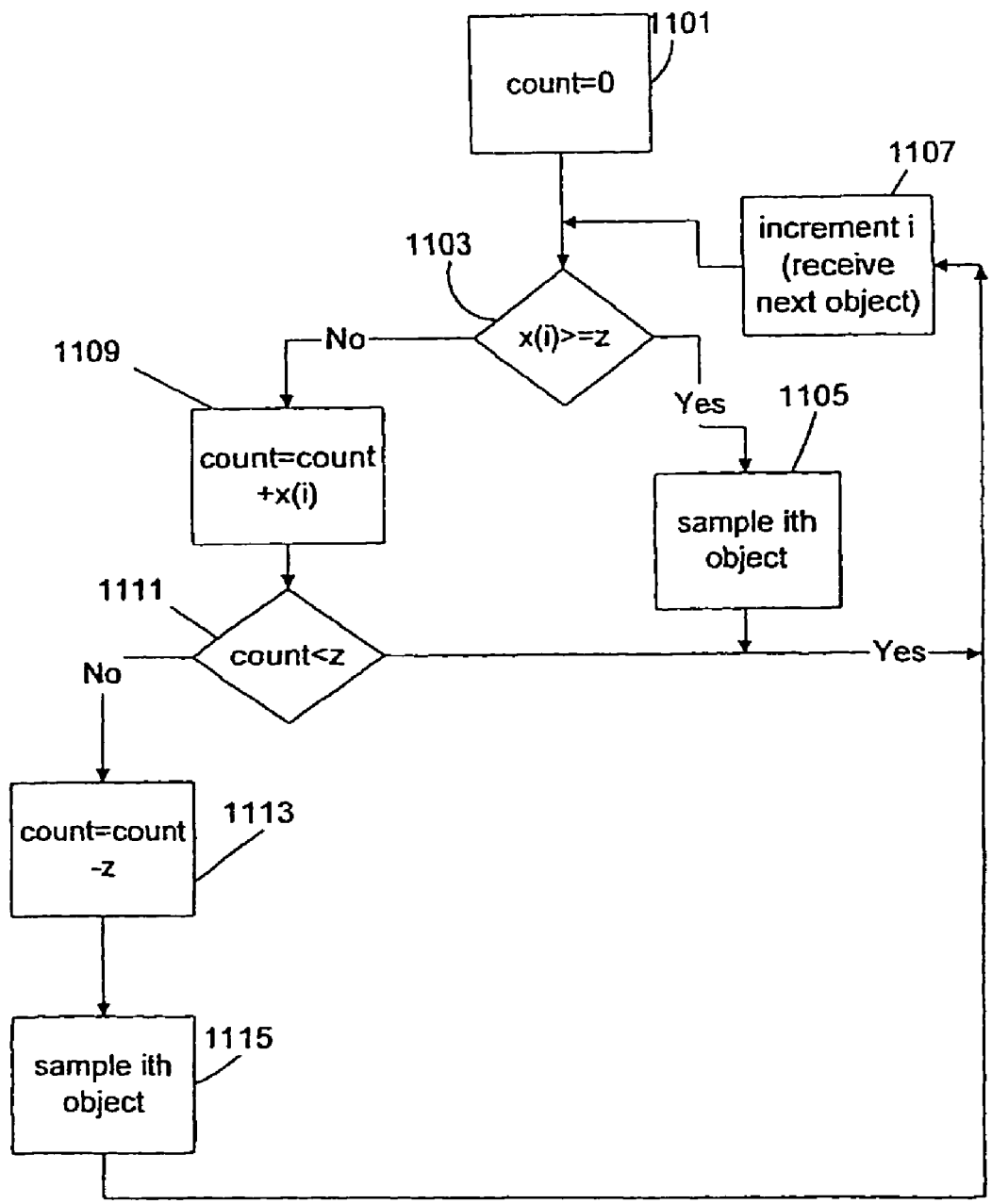
FIG. 11 is a flow diagram for a quasi-random data sampling algorithm.

FIG. 7 is a flow diagram for charging with sampled network usage in accordance with the exemplary embodiment. In step 701, threshold z is determined according to the relative error and the unbillable usage. In step 703, it is determined whether to sample an object that is associated with the customer in accordance with the size of the object and the probabilistic function $p_z(x)$. (The discussion with respect to FIG. 11 presents a method for determining whether to sample the objects based upon the size.) The associated usage is determined from the size of the sampled object by dividing the size by the $p_z(x_i)$ in step 705. At the end of the billing in step 707, the usage sensitive pricing for the customer is calculated in step 709 in accordance with Equation 4 and adjustments by the service provider. In step 711, the usage is reset to 0 so that the usage for the next billing period can be calculated.

The present invention, as disclosed by the exemplary embodiment, also enables the service provider to control the sample volume that is generated by data network 100. Moreover, in data network 100, the amount of data is dynamic with time, and consequently the sampling rate needs to adjust accordingly. In other words, dynamic control of the mean sample volume may be needed.

An object (flow) may be distinguishable by an attribute. (Each object is characterized by a size that may be expressed in a number of packets, bytes (octets), or ATM cells contained in the object. The number is equal to at least one.) In such a case, the object is characterized as being colored. The present invention allows the service provider to estimate the total size of the objects in each color class c. If $c_i$ is the color of packet i, then $$X(c) = \sum_c x_i$$

is the total size of the objects with color c, and the unbiased estimator is then $$\hat{X} = \sum_i w_i r(x_i),$$

in which $\hat{X}(c)$ is obtained simply by summing the sampled normalized sizes of color c. Let $$\hat{X}(c) = \sum_c w_i$$

be the number of sampled objects with color c. By the linearity of expectation, $$E(N) = \sum E(\hat{N}(c)).$$

Also, since each $x_i$ is picked independently, $\hat{X}(c)$ is independent for each c, and hence $$Var\, X = \sum_c Var\, \hat{X}(c).$$

Thus, $$C_z(p) = Var\, \hat{X} + z^2 E(\hat{N}) \quad (7)$$

where p is a probability function that is utilized for determining if an object is to be sampled.

The objective (cost) function $C_z(p)$ is minimized locally over each color class. With variations of the exemplary embodiment, there may be scenarios in which there are different objectives for different colors. However, in the exemplary embodiment, the sampling device does not distinguish colors; however, samples can be later analyzed with respect to any combination of colors.

Finer control of sampling by color, within a given volume constraint, can only increase estimator variance. By applying a different threshold $z_c$ to the sampling of packets for each color, the service provider can control the sampling volume for each color. However, this approach increases the aggregate variance of $\hat{X}(c)$.

In a dynamic context the volume of objects presented for sampling will generally vary with time. Thus, in order to be useful, a mechanism to control the number of samples must be able to adapt to temporal variations in the rate at which objects are offered for sampling. This is already an issue for the 1 in N sampling algorithm, since it may be necessary to adjust N, both between devices and at different times in a single device, in order to control the sampled volumes. For the optimal algorithm, the service provider can control the volume by an appropriate choice of the threshold z. Moreover, one can dynamically adapt (i.e. updating) z knowing only the target and current sample volumes.

Figure 12:
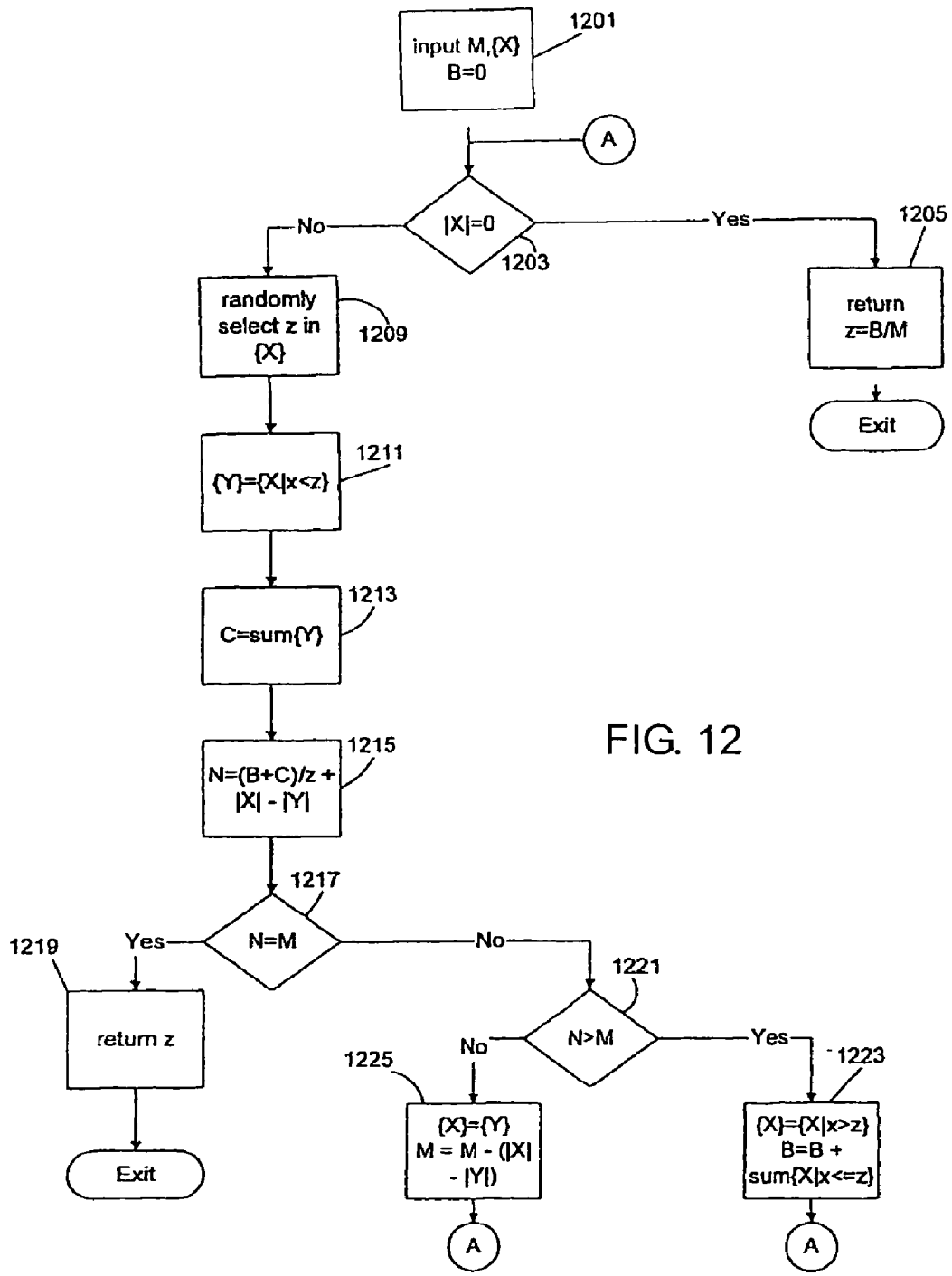
FIG. 12 is a flow diagram for root finding algorithm.

Consider the case in which the targeted sampling volume M is less than n, which is the total number of objects from which to sample.

$$\hat{N}_z = \sum_i w_i$$

is the total number of samples obtained using the sampling function $p_z$. The expected number of samples $$N_z = E(\hat{N}_z) = \sum_i p_z(x_i)$$

is a non-increasing function of z. A direct approach to finding z* is to construct an algorithm to find the root, utilizing a set of $x_i$ (sizes of the sampled objects). FIG. 12, which is discussed later, illustrates the approach utilized in the exemplary embodiment.

Alternatively, the service provider can dynamically adapt (i.e. updating) z knowing only the target and current sample volumes. One approach is update z by:

$$z_{k+1} = z_k \hat{N}/M \quad (8)$$

where M is the target sampling volume and $\hat{N}$ is the measured sampling volume and where both correspond to the kth sampling window. As another alternative for dynamically updating z, the service provider can utilize the following:

$$z_{k+1} = z_k (\hat{N} - \hat{R})/(M - \hat{R}) \quad (9)$$

where M is the target sampling volume, $\hat{N}$ is the measured sampling volume, and $\hat{R}$ is the measured sampling volume for objects having a size greater than $z_k$, and where all correspond to the kth sampling window. (In the disclosure, "sampling window" is defined as being an interval during which objects are presented for sampling. The interval may be measured in time, e.g., in online applications where each object occurs at some time during the window. In offline applications, the objects have already been collected, and are then sampled offline. In this case, the interval might be measured in time, i.e. objects collected in a particular time window are presented for sampling, or in number where a certain number of objects are presented for sampling. The endpoint of the window may be determined prior to sampling, or it may depend on the objects, e.g. through the number that are sampled and/or their sizes.)

Figure 8:
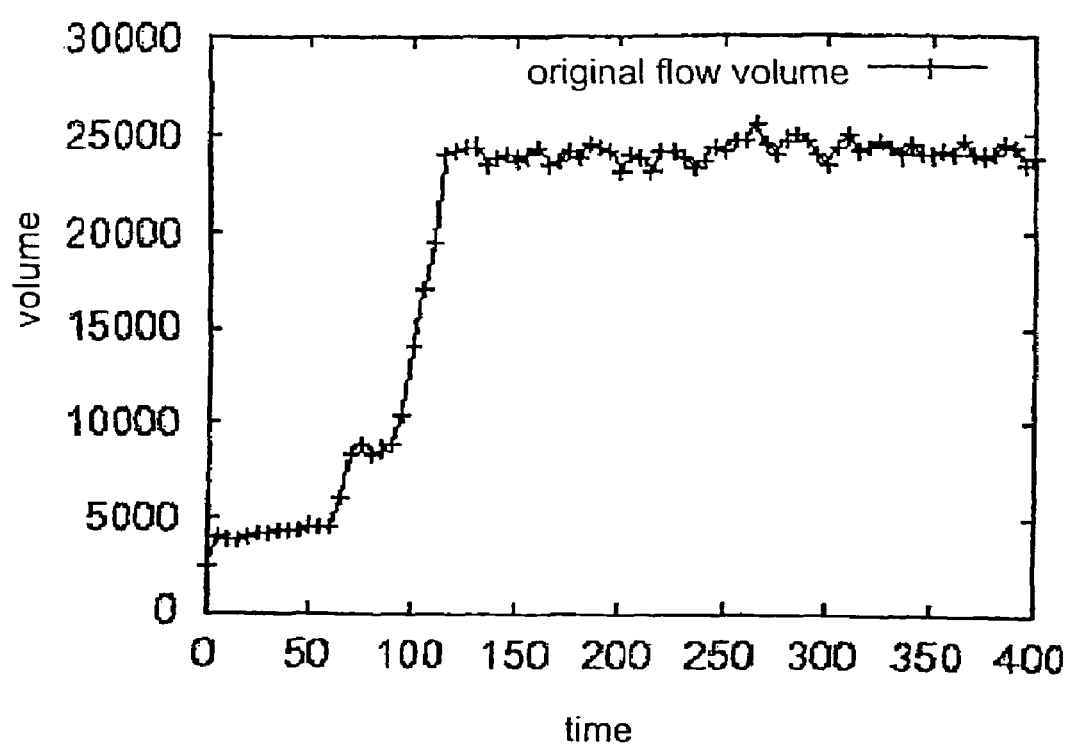
FIG. 8 shows an example of traffic flow volumes in a data network.
Figure 9:
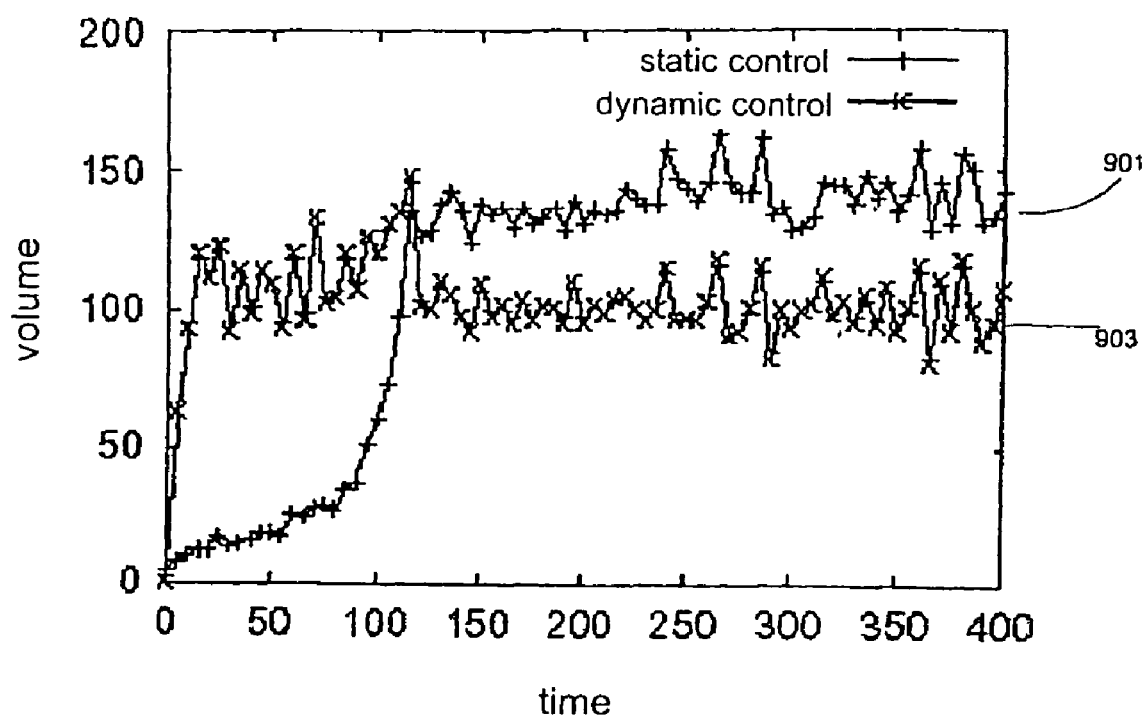
FIG. 9 shows static and dynamic controlled sampling volumes in relation to FIG. 8.

FIG. 8 shows an example of traffic flow volumes in data network 100. At approximately 100 seconds, data network 100 incurs a sudden increase of the traffic volume. FIG. 9 shows static (curve 901) and dynamic controlled (curve 903) sampling volumes in relation to FIG. 8. By adjusting threshold z, the sampling volume remains substantially constant relative to the sampling volume corresponding to a fixed threshold z.

If the arrival rate of objects to be sampled grows noticeably over a time scale shorter than the time duration (window width) of a sampling window, the exemplary embodiment enables the service provider to execute immediate corrective measures. The measured sampling volume $\hat{N}$ may significantly exceed the target M before the end of the sampling window. In the exemplary embodiment, if a target sample volume is already exceeded before the end of a window, the service provider should immediately change the threshold z. In this context, the windowing mechanism is a timeout that takes effect if N has not exceeded M by the end of the window.

There are several variations of the exemplary embodiment. The corresponding emergency control can use timing information. If N already exceeds M at time t from a start of a window of length T, z is immediately replace by zT/t. Furthermore, if data network 100 provides control over the window boundaries, the a new sampling window can be started at that time. Otherwise, from time t one can reaccumulate the sample count N from zero, and the test and remedy procedure is repeated as needed for the remainder of the sampling window.

The target sampling volume M can be reduced to compensate for sampling variability. With a target sampling volume M, one can expect a relative error on $\hat{N}$ of about $1/\sqrt{M}$. In order to guard against statistical fluctuations of up to s standard deviations from a target sampling volume M, the target sampling volume can be adjusted by:

$$M_s = M - s\sqrt{M} \qquad (10)$$

where $M_s$ is the compensated target sampling volume.

Figure 10:
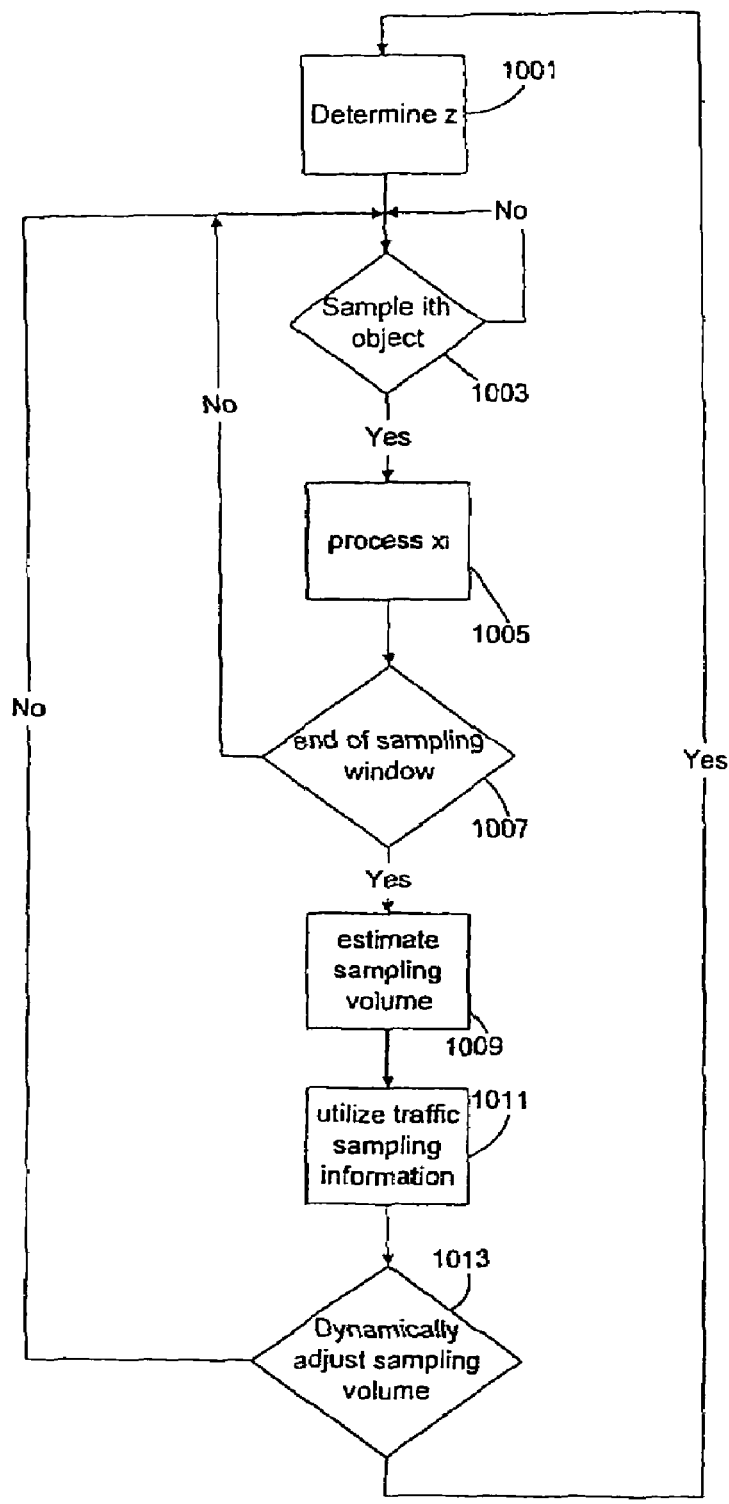
FIG. 10 is a flow diagram for controlling the sampling volume in a data network.

FIG. 10 is a flow diagram for controlling the sampling volume in data network 100. The value of z is determined in accordance with a targeted sample volume. (FIG. 12 provides a method for determining z.) In step 1003, it is determined whether to sample the ith object having a size $x_i$. (FIG. 11 provides a method for determining whether to sample the ith object.) If the object is sampled, then the corresponding traffic volume is estimated by normalizing $x_i$ by $p_z(x_i)$ and accumulated to the estimated traffic volume in step 1005. At the end of the sampling window as determined by step 1007, the sampling volume is estimated in step 1009 for data network 100. If the sampling window is not completed, then step 1003 is repeated. In step 1011, the estimated sampling volume is utilized by the service provider in maintaining data network 100. There are a spectrum of associated activities, including traffic engineering studies, network planning, peering policy, customer acquisition, marketing, and network security. As part of the network planning activity, the service provider can reconfigure the data network to be better matched to the traffic volume.

FIG. 11 is a flow diagram for a quasi-random data sampling algorithm The process shown in FIG. 11 can be utilized by step 703 or by step 1003 in determining whether to sample an object (flow). In the exemplary embodiment as shown in FIG. 11, it is assumed that the variable "count" has a uniformly distributed value between 0 and z−1. In step 1101, count is reset to zero. In step 1103, the size of the object $x_i$ is compared to z. If $x_i$ is greater or equal to z, then the ith object is sampled in sample 1105. The index i is incremented by 1 in step 1107 so that the next object is considered in the next execution of step 1103. However, if $x_i$ is less than z in step 1103, then count is incremented by $x_i$ in step 1109. If count is greater than or equal to z in step 1111, count is decremented by z in step 1113 and the ith object is sampled in step 1115. However, if count is less than z in step 1111, index i is incremented by 1 in step 1107 so that the next object is considered for the next execution of step 1103.

FIG. 11 is one embodiment of a quasi-random data sampling algorithm. One skilled in the art appreciates that other quasi-random embodiments can be utilized in order to determine whether to sample an object.

FIG. 12 is a flow diagram for root finding algorithm that may be utilized in determining or updating z in step 701 (FIG. 7) or step 1001 (FIG. 10). Discussion of FIG. 12 is facilitated with specific notations as follow.

{X} is a set $\{x_i\}$, where each $x_i$ is the size of the ith object
{X|condition} is a subset of {X}, where each member satisfies the given condition
|X| is a number that is equal to the number of members in the set {X}
sum{Y} is a number equal to the sum of the members of {Y}

The approach of the process shown in FIG. 12 is to select a candidate z and to determine if the candidate z is satisfactory, too large, or too small. The process utilizes a collection of numbers corresponding to the sizes of previously sampled objects and the target sampling volume M. However, the process as illustrated in FIG. 12 does not change the value of M. Rather, variables M, B, and C are internal variables that are used for calculations. The process only returns the appropriate value of z in steps 1205 and 1219.

In step 1201, M and {X} are inputted. Internal variable B is reset to zero. In step 1203, the number of members in {X} is compared to zero. If so, z=B/M is returned in step 1205 and the routine is exited. In step 1209, z is randomly selected from {X}. An efficient implementation may require that z be picked randomly from {X} so that the expectation is somewhere in the middle with respect to size. However, assuming that the order of the members from {X} is independent of size, one can let z be equal to the first member in {X}. In step 1211, set {Y} consists of the members of {X} whose values are less than z. In step 1213, C=sum{Y}, where C is an internal variable that is used for calculations. In step 1215, N=(B+C)/z+|X|−|Y|. |X| and |Y| are equal to the number of elements contained in {X} and {Y}, respectively. In step 1217, N is compared to M. If so, z is equal to $x_i$ that was selected in step 1209. If N is not equal to M, then step 1221 determines if N is greater than M. If so, {X}={X|x>z} in step 1223. In other words, members of set {X} are removed from the set whose values that are smaller or equal to z. Also, B=B+sum {X|x<=z}. In other words, B is incremented by the sum of the members that are removed from the set {X}. Step 1203 is then repeated. If step 1221 determines that N is not greater than M, then N is less than M. In that case, step 1225 is executed. In step 1225, set {X} is equal to set {Y}, where {Y} consists of the members of the previous set {X} that are less than z (as determined by step 1211). Also, M=M−(|X|−|Y|). In other words, M is reduced by |X|−|Y|. Step 1203 is then repeated.

Figure 13:
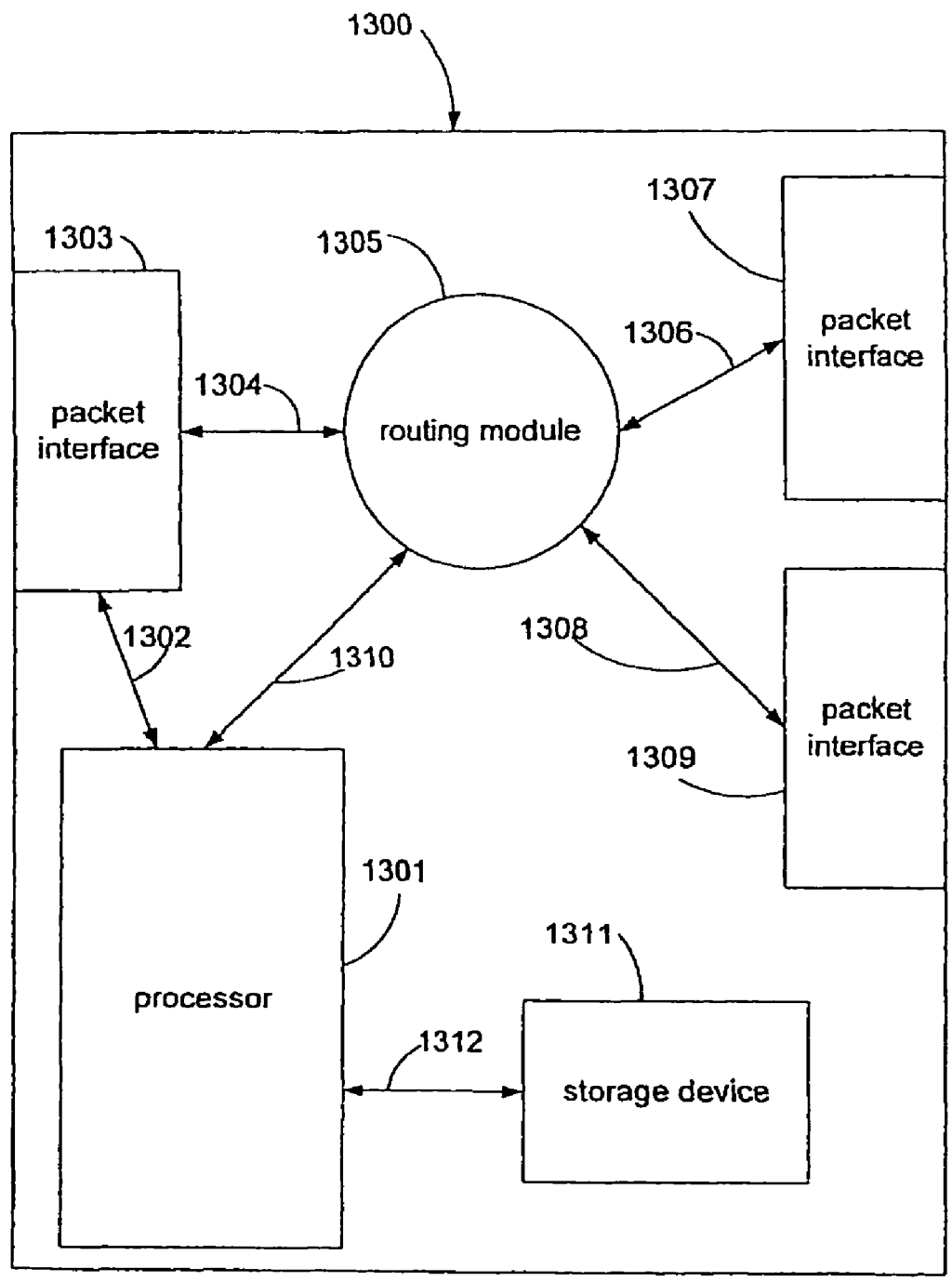
FIG. 13 shows an apparatus for managing a data network in accordance with the present invention.

FIG. 13 shows an apparatus 1300 for managing a data network in accordance with the present invention. Apparatus 1300 receives and sends packets that are transported by a data network through packet interface 1303. Processor 1301 receives packets containing traffic information through link 1302 from packet interface 1303. In a variation of the embodiment, apparatus 1300 provides router functionality with routing module 1305. Routing module 1305 directs packets between packet interface 1303 and packet interface 1307 through links 1304 and 1306 and between packet interface 1303 and packet interface 1309 through links 1304 and 1308. Processor 1301 configures routing module 1305 through link 1310 in accordance with the traffic information that is received through link 1302. Processor 1301 executes computer instructions corresponding to the flow diagrams shown in FIGS. 7, 10, 11, and 12.

In another variation of the embodiment, processor 1301 stores traffic information (that is received through link 1302) to storage device 1311 through link 1312 for later retrieval (e.g. billing information for charging a customer).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

It is to be understood that the above-described embodiment is merely an illustrative principle of the invention and that many variations may be devised by those skilled in the art without departing from the scope of the invention. It is, therefore, intended that such variations be included with the scope of the claims.

Although various embodiments with respect to size-dependent sampling have been described hereinabove, one alternative embodiment comprises sampling under hard resource constraints. In the sampling embodiments described above, objects are sampled independently such that an object of size x is sampled with a probability $p_z(x) = \min\{1, x/z\}$, where the sampling parameter z operates as a threshold such that items of size z and larger are always sampled. In this manner, sampling parameter z is a configurable parameter that may be static or may be reconfigured dynamically in order to control the number of samples taken. It should be noted, however, that using the methodologies described hereinabove; no firm bound is placed on the number of samples taken. For example, a sudden burst of incoming items may overload the sampling system before sampling parameter z is reconfigured to control the burst of items.

As described with respect to preceding embodiments, a measurement period is divided into a number of successive windows, and during a given window, n flow records of respective sizes $x_i$ (where $i=1, \ldots n$) are received. As described with respect to the preceding embodiments, each flow record i has at least one associated key $c_i$, where a key is an attribute that distinguishes the flow records of one flow from the flow records of another flow. For a given key c in the set of C keys represented in a given interval, the total usage of key c is given by $$X(c) = \sum x_i$$

where $x_i$ corresponds to the size of the attribute (key) of interest from flow i (e.g., the number of packets in the flow, the number of bytes in the flow, and like quantities of interest).

A significant limitation in many network management applications (as well as other systems processing large quantities of data objects) is the inability to respond to arbitrarily large bursts of flow records (e.g., during a network virus attack, during sudden widespread interest in a particular website, and under like conditions). In general, such situations typically involve enormous quantities of data that cannot be processed using existing network resources. As such, alternative embodiments of the present invention may be implemented in order to account for such situations in which flow record sampling is performed under hard resource constraints.

In one alternative embodiment of the present invention, a firm bound is placed on the number of objects sampled. In one such embodiment, the firm bound may be implemented by selecting the m "best" objects (flow records) from the population of n available objects (flow records) available for sampling. In one embodiment, such a flow record may comprise at least one of an Internet Protocol (IP) flow record, an Asynchronous Transfer Mode (ATM) flow record, a Frame Relay (FR) flow record, a Synchronous Optical Network (SONET) flow record, and like communications flow records. This embodiment enables observance, through sampling, of sufficient data for unbiased estimates of total usage $X_{TOT}(c)$. As such, unbiased estimates of total usage $X_{TOT}(c)$ may be achieved under conditions in which hard resource constraints limit the number of samples that may be received and processed.

Figure 14:
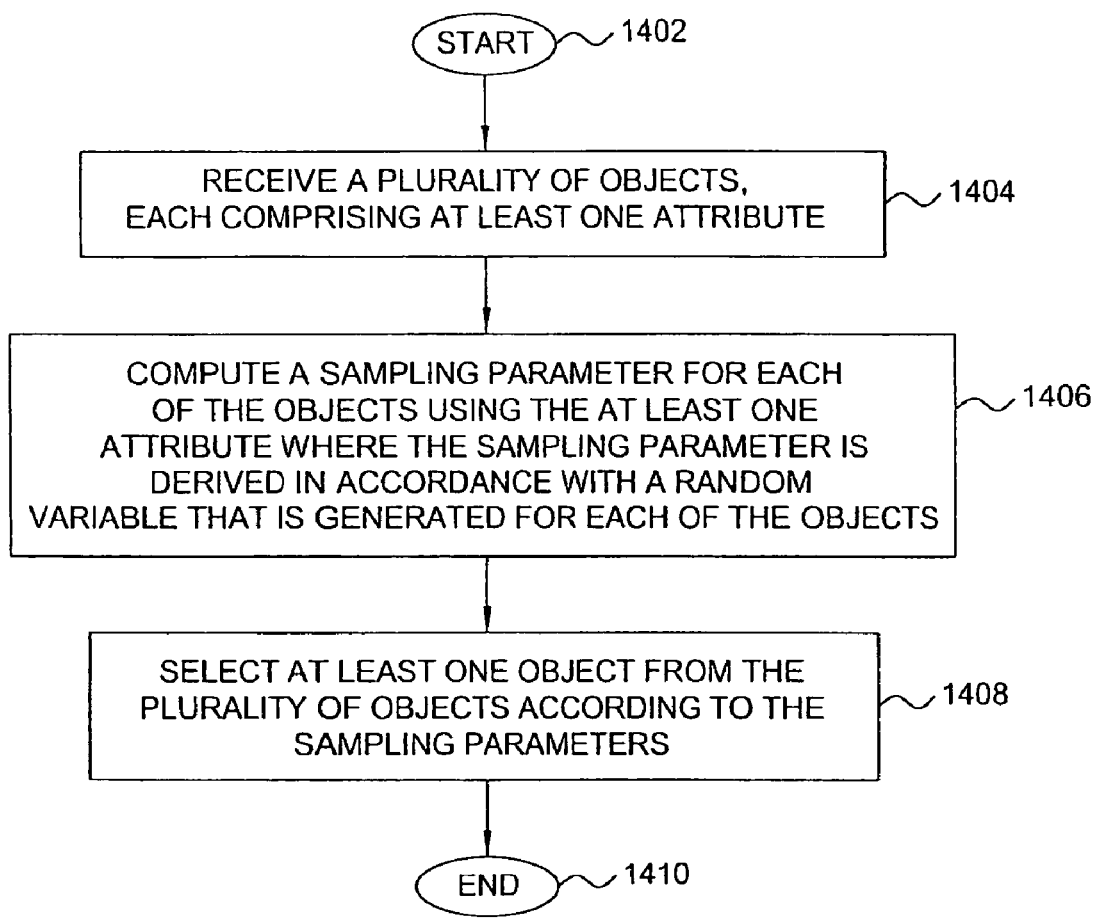
FIG. 14 depicts a flow diagram of a method according one embodiment of the invention.

FIG. 14 depicts a flow diagram of a method according to one embodiment of the invention. Specifically, method 1400 of FIG. 14 comprises a method for selecting at least one object from a plurality of objects. The method 1400 is entered at step 1402 and proceeds to step 1404. At step 1404, a plurality of objects is received, where each of the objects comprises at least one attribute. At step 1406, a sampling parameter is computed for each of the objects. In one embodiment, each sampling parameter is computed using the at least one attribute. In one embodiment, the sampling parameter is derived in accordance with a random variable that is generated for each of the objects. At step 1408, at least one object is selected from the plurality of objects according to the sampling parameters. The method 1400 then proceeds to step 1410 where method 1400 ends.

It should be noted that the data sampling methodology depicted and described with respect to FIG. 14 may be implemented using at least one of a variety of specific designs. For example, in one alternative embodiment, depicted with respect to FIG. 15, the full set of n flow records available within a given window may be received and stored prior to flow record selection processing. In another alternative embodiment, depicted with respect to FIG. 16, each object i may undergo flow record selection processing as it is received such that, at most, m+1 flow records are required to be stored at any given time.

Figure 15:
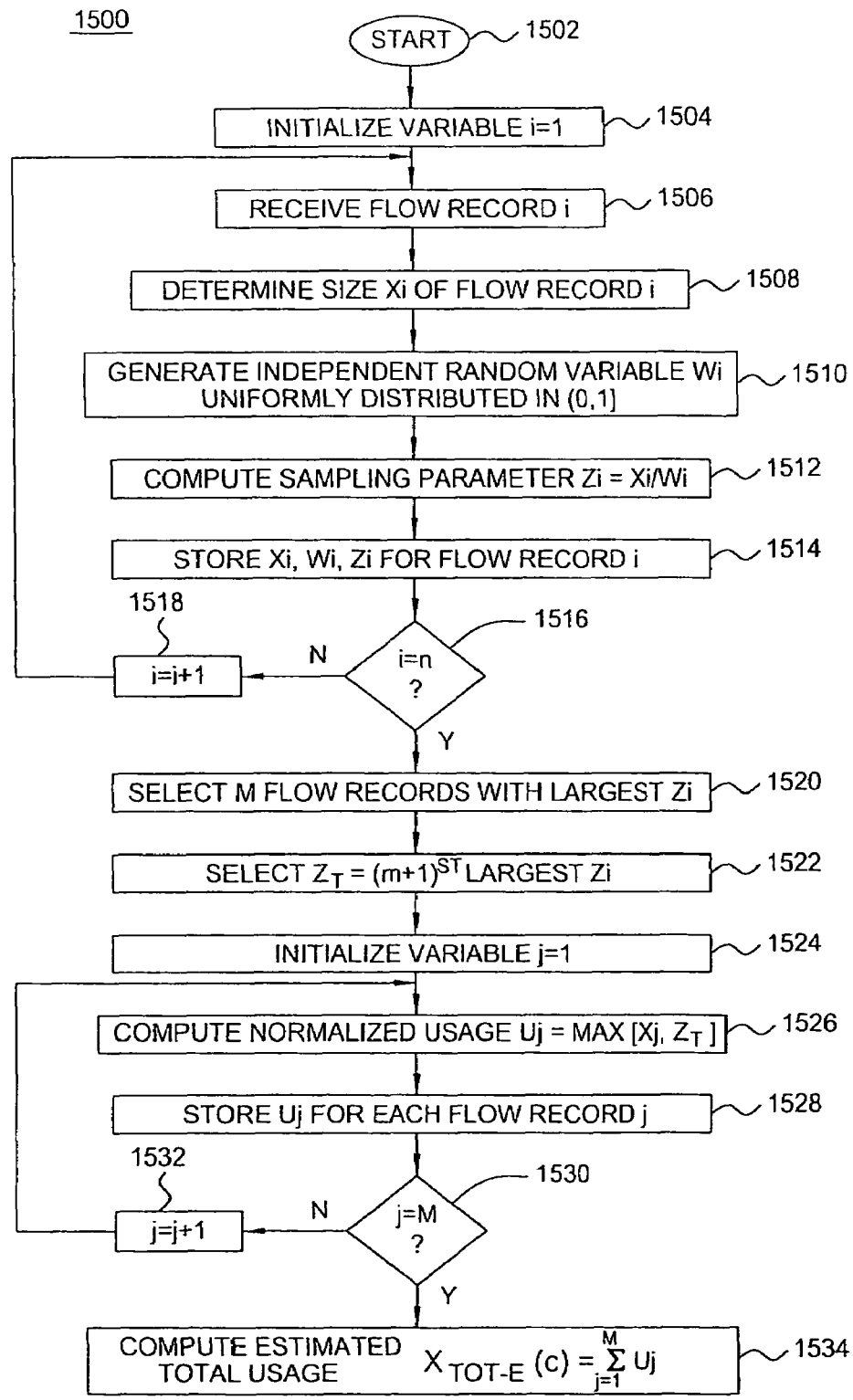
FIG. 15 depicts a detailed flow diagram of the method depicted in FIG. 14.

FIG. 15 depicts a detailed flow diagram of the method depicted in FIG. 14. As such, a single step as depicted in FIG. 14 may correspond to multiple steps as depicted in FIG. 15. In general, method 1500 of FIG. 15 comprises a method for selecting at least one object from a plurality of available objects. More specifically, method 1500 comprises a method for sampling a fixed number (m) of flow records from a population of n>m flow records (each flow record i comprising at least one key $c_i$) while maintaining the ability to compute an unbiased estimated total usage $X_{TOT-E}(c)$ for each key c. Although depicted as being performed serially, those skilled in the art will appreciate that at least a portion of the steps of method 1500 may be performed contemporaneously. The method 1500 is entered at step 1502 and proceeds to step 1504.

At step 1504, counter variable i is initialized to one (i=1), where counter variable i is used to count through the n available flow records. At step 1506, flow record i is received. At step 1508, size $x_i$ associated with an attribute of flow record i is determined. At step 1510, an independent random variable $w_i$ is generated. In one embodiment, $w_i$ is uniformly distributed in (0,1]. At step 1512, a sampling parameter $z_i$ is computed using size $x_i$ from step 1508 and independent random variable $w_i$ from step 1510. The sampling parameter $z_i$ is computed as $z_i = x_i/w_i$. At step 1514, size $x_i$, independent random variable $w_i$, and sampling parameter $z_i$ are stored for flow record i. In one embodiment, the $x_i$, $w_i$, and $z_i$ values are stored in at least one of a memory, database, and like components as known in the art.

At step 1516, a determination is made as to whether the counter variable i and total available flow records n are equal. In other words, a determination is made as to whether the $n^{th}$ flow record has been received and processed. If i does not equal n, method 1500 proceeds to step 1518, at which point counter variable i is incremented by one (i=i+1). The method 1500 then returns to step 1506, at which point the next flow record is received. If i does equal n, method 1500 proceeds to step 1520, at which point flow record selection processing begins. In one embodiment, in which the number of total available flow records n is unknown, the use of counter variable i (and corresponding total available flow records n) may be replaced with a determination as to whether all flow records have been received. For example, a determination may be made as to whether the end of the current sampling window has been reached.

At step 1520, m flow records having the largest sampling parameters $z_i$ are selected for sampling. In one embodiment, selection of the m flow records comprises determining a sampling threshold from the sampling parameters $z_i$, and comparing each of the sampling parameters to the sampling threshold. At step 1522, the $(m+1)^{th}$ largest sampling parameter is selected for use in computation of normalized usage values for each of the m selected flow records. The $(m+1)^{th}$ largest sampling parameter is the sampling threshold, and is denoted as $z_T$.

At step 1524, counter variable j is initialized to one j=1), where counter variable j is used to count through the m selected flow records. At step 1526, a normalized usage $u_j$ is computed for the $j^{th}$ selected flow record. In one embodiment, normalized usage $u_j$ is computed using a maximum function such as $u_j=\max\{x_j,z_T\}$. In other words, normalized usage $u_j$ for the $j^{th}$ selected flow record comprises the greater of the size $x_j$ associated with the $j^{th}$ flow record and sampling threshold $z_T$ determined at step 1522. At step 1528, normalized usage $u_j$ is stored for selected flow record j. In one embodiment, the $x_j$, $w_j$, $z_j$, and $u_j$ values associated with flow record j are stored in at least one of a memory, database, and like components as known in the art.

At step 1530, a determination is made as to whether counter variable j and total selected flow records m are equal. In other words, a determination is made as to whether the $m^{th}$ selected flow record has been processed to determine an associated normalized usage $u_j$. If j does not equal m, method 1500 proceeds to step 1532, at which point counter variable j is incremented by one (j=j+1). The method 1500 then returns to step 1526, at which point a normalized usage is computed for the next selected flow record. If j does equal m, method 1500 proceeds to step 1534.

At step 1534, an estimated total usage is computed. In one embodiment, the estimated total usage X may be computed for a specific key c (i.e., estimated total usage $X_{TOT-E}(c)$). The estimated total usage $X_{TOT-E}(c)$ may be computed as a summation of the normalized usage values $u_j$ associated with each of the m selected flow records for the specified key (e.g., attribute, such as number of packets, number of bytes, and like attributes). In other words, $X_{TOT-E}(c)$ is computed as:

$$X_{TOT-E}(c) = \sum_{j=1}^{m} u_j \quad (11)$$

In the embodiment depicted and described with respect to FIG. 15, all n available flow records are received and stored prior to the flow record selection processing required to determine the m representative flow records. It should be noted, however, that there are situations in which it is undesirable to maintain all n received flow records during flow record selection processing. As such, since flow records are typically received sequentially, an alternative embodiment comprises a method for processing received flow records sequentially as each flow record is received such that a maximum of m+1 flow records are stored at any given time. For example, a min-priority queue of at most m+1 flow records may be implemented, where the priority of the min-priority queue is determined according to the respective sampling parameters $z_i$. As such, after reaching full capacity, the min-priority queue comprises the m+1 flow records of the largest sampling parameters thus far received. Similar to the embodiment described with respect to FIG. 15, in this embodiment, each flow record i comprises at least one flow key (attribute) $c_i$ having a corresponding flow size $x_i$, a random variable $w_i$, and a sampling parameter $z_i$.

Figure 16:
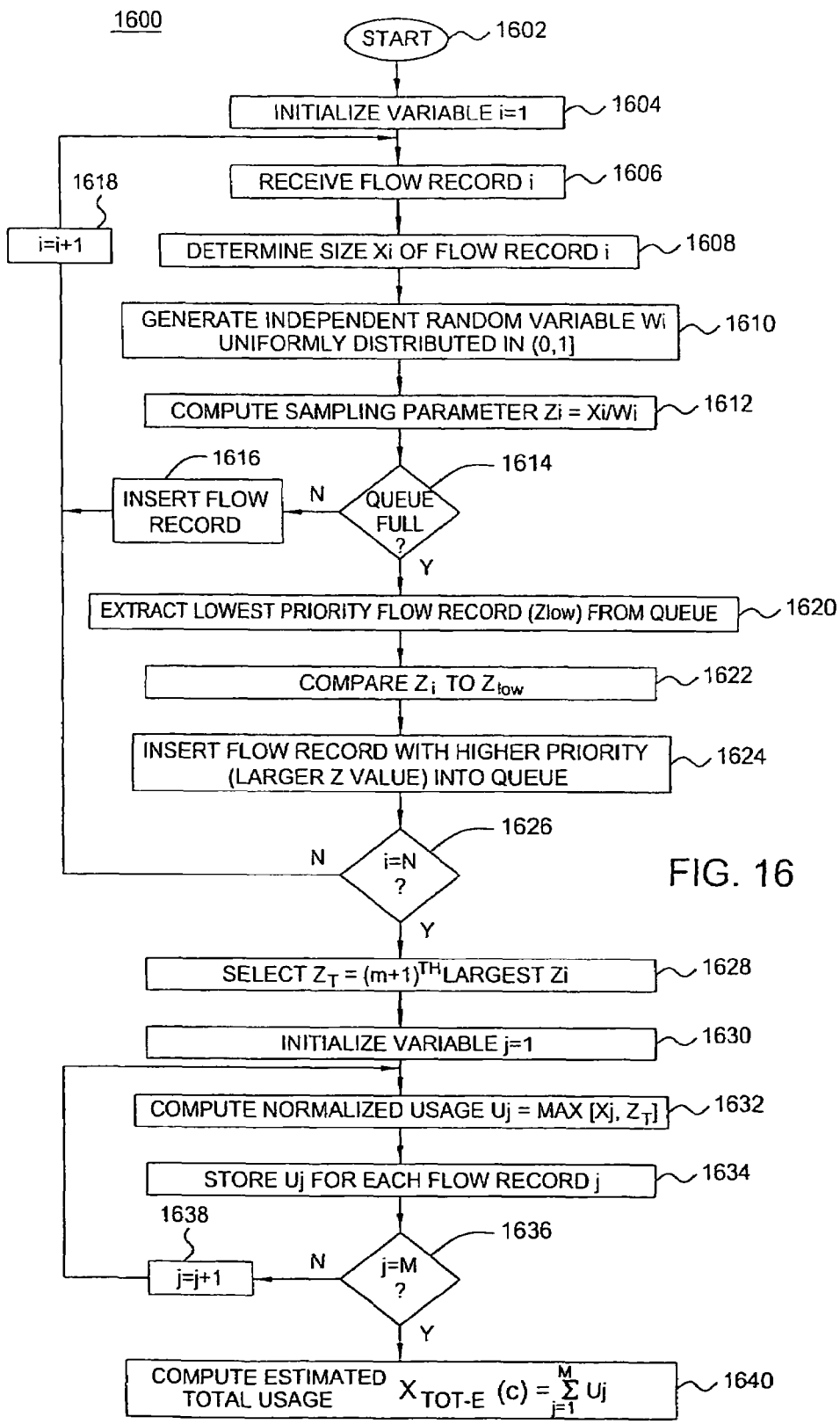
FIG. 16 depicts a detailed flow diagram of the method depicted in FIG. 14.

FIG. 16 depicts a detailed flow diagram of the method depicted in FIG. 14. As such, a single step as depicted in FIG. 14 may correspond to multiple steps as depicted in FIG. 16. In general, method 1600 of FIG. 16 comprises a method for selecting at least one object from a plurality of available objects. More specifically, method 1600 comprises a method for sampling a fixed number (m) of flow records from a population of n>m flow records (each flow record i comprising at least one key $c_i$) while maintaining the ability to compute an unbiased estimated total usage $X_{TOT-E}(c)$ for each key c. Although depicted as being performed serially, those skilled in the art will appreciate that at least a portion of the steps of method 1600 may be performed contemporaneously. The method 1600 is entered at step 1602 and proceeds to step 1604.

At step 1604, counter variable i is initialized to one (i=1), where counter variable i is used to count through the n available flow records. At step 1606, flow record i is received. At step 1608, an attribute (size $x_i$) of flow record i is determined. At step 1610, an independent random variable $w_i$ is generated. In one embodiment, $w_i$ is uniformly distributed in (0,1]. At step 1612, a sampling parameter $z_i$ is computed using size $x_i$ from step 1608 and independent random variable $w_i$ from step 1610. The sampling parameter $z_i$ is computed as $z_i=x_i/w_i$. At step 614, a determination is made as to whether the min-priority queue is full. In one embodiment, the min-priority queue comprises m+1 slots, where m comprises the number of flow records to be selected for sampling.

If the min-priority queue is not full, method 1600 proceeds to step 1616, at which point flow record i is inserted into the min-priority queue. In one embodiment, at least the size $x_i$, independent random variable $w_i$, and sampling parameter $z_i$ associated with flow record i are stored in the min-priority queue. In one embodiment, the min-priority queue is implemented using at least one of a memory, database, and like components for implementing queues as known in the art. The method 1600 then proceeds to step 1618, at which point counter variable i is incremented by one (i=i+1). The method 1600 then returns to step 1606, at which point the next flow record is received. If the min-priority queue is full (the m+1 queue slots are occupied), method 1600 proceeds to step 1620. In one embodiment, the determination as to whether the min-priority queue is full may be implemented by comparing a counter variable to min-priority queue size m+1.

At step 1620, the lowest priority (smallest sampling parameter $z_{low}$) flow record is extracted from the min-priority queue. In one embodiment, priority is determined according to the sampling parameters $z_i$ such that the lowest priority flow record comprises the lowest sampling parameter, denoted $z_{low}$. At step 1622, the sampling parameter $z_i$ of the current flow record is compared to the sampling parameter $z_{low}$ of the flow record extracted from the min-priority queue in step 1620. At step 1624, the flow record comprising the larger sampling parameter is inserted into the min-priority queue. In other words, if $z_{low}$ is larger than $z_i$, the flow record extracted at step 1620 is reinserted into the min-priority queue, and if $z_i$ is larger $z_{low}$, flow record i received at step 1606 is inserted into the min-priority queue in place of the flow record extracted at step 1620.

At step 1626, a determination is made as to whether the counter variable i and total available flow records n are equal. In other words, a determination is made as to whether the $n^{th}$ flow record has been received and processed. If i does not equal n, method 1600 returns to step 1618, at which point counter variable i is incremented by one (i=i+1). The method 1600 then returns to step 1606, at which point the next flow record is received. If i does equal n, method 1600 proceeds to step 1628, at which point usage normalization processing begins. In one embodiment, in which the number of flow records to be sampled is unknown, the use of counter variable i (and corresponding total available flow records n) is replaced with a determination as to whether all flow records have been received. For example, a determination may be made as to whether the end of the current sampling window has been reached.

At step 1628, the $(m+1)^{th}$ largest sampling parameter is selected for use in computation of normalized usage values for each of the m selected flow records. Since the m flow records having the largest sampling parameters $z_i$ are stored in the min-priority queue, flow record selection step 1520 depicted in FIG. 15 is essentially implemented in-line according to the processing associated with steps 1606 through 1624 depicted in FIG. 16. Furthermore, since the min-priority queue comprises the flow records having the m+1 largest sampling parameters, the $(m+1)^{th}$ largest sampling parameter corresponds to the lowest sampling parameter in the min-priority queue. The $(m+1)^{th}$ largest sampling parameter is the sampling threshold, denoted as $z_T$.

At step 1630, counter variable j is initialized to one (j=1), where counter variable j is used to count through the m selected flow records. At step 1632, a normalized usage $u_j$ is computed for the $j^{th}$ selected flow record. In one embodiment, the normalized usage $u^j$ is computed using a maximum function such as $u_j = \max\{x_j, z_T\}$. In other words, for the $j^{th}$ selected flow record, normalized usage $u_j$ is the greater of the size $x_j$ associated with the $j^{th}$ flow record and sampling threshold $z_T$. At step 1634, normalized usage $u_j$ is stored for selected flow record j. In one embodiment, the $x_j$, $w_j$, $z_j$, and $u_j$ values associated with flow record j are stored in at least one of a memory, database, and like components as known in the art.

At step 1636, a determination is made as to whether counter variable j and total selected flow records m are equal. In other words, a determination is made as to whether the $m^{th}$ selected flow record has been processed to determine an associated normalized usage $u_j$. If j does not equal m, method 1600 proceeds to step 1638, at which point counter variable j is incremented by one (j=j+1). The method 1600 then returns to step 1632, at which point a normalized usage is computed for the next selected flow record. If j does equal m, method 1600 proceeds to step 1640, at which point an estimated total usage is computed. In one embodiment, the estimated total usage X is computed for a specific key c (i.e., estimated total usage $X_{TOT-E}(c)$). The estimated total usage $X_{TOT-E}(c)$ may be computed as a summation of the normalized usage values $u_j$ associated with each of the m selected flow records for the specified key (e.g., attribute, such as number of packets, number of bytes, and like attributes). In other words, $X_{TOT-E}(c)$ is computed according to EQUATION 11 described herein with respect to FIG. 15.

As depicted and described with respect to FIG. 16, an average queue processing cost may be determined to quantify the average time required to insert a flow record into (or delete a flow record from) the min-priority queue. For example, during the processing of each received flow record, both the insertion of a flow record (e.g., steps 1616 and 1624) and the deletion of the flow record with the lowest priority (e.g., steps 1620, 1622, and 1624) may require O(log m) time using a standard heap. It should be noted that since each sampling parameter $z_i$ comprises either an integer or a floating-point number, the insertion and deletion operation times may be reduced to O(log (log m)).

In another embodiment, a min-priority queue comprising 2 m+2 slots may be used. By implementing the min-priority queue such that 2 m+2 flow records may be stored, the average queue processing cost may be reduced to a constant value. For example, flow records may be inserted into the min-priority queue until 2 m+2 slots of the min-priority queue have been filled. Upon inserting the $(2 m+2)^{th}$ flow record into the min-priority queue, min-priority queue cleanup is performed in order to reduce the min-priority queue occupancy from 2 m+2 flow records to m+1 flow records. Using at least one of the selection methodologies described herein, the flow records comprising the $(m+1)^{th}$ largest sampling parameters may be identified, and flow records having smaller sampling parameters may be deleted from the min-priority queue.

In one embodiment, insertion of flow records into and deletion of flow records from the min-priority queue is performed in time linear in m. Since the cleaning of the min-priority queue is implemented once for each m+1 insertions into the min-priority queue, the average queue processing cost is O(1) per flow record processed. Following completion of min-priority queue cleanup, refilling of the min-priority queue with received flow records is resumed. It should be noted that the time between successive flow record arrivals may have a lower bound equal to the average queue processing cost O(1) per flow record processed.

In another embodiment, each received flow record is processed in constant time, obviating a need for arriving flow records to wait for completion of min-priority queue cleanup processing. For example, in one such embodiment, two min-priority queues, each comprising 2 m+2 slots, may be utilized. In this embodiment, one min-priority queue may be used for flow record collection while the other min-priority queue undergoes min-priority queue cleanup to reduce that min-priority queue occupancy from 2 m+2 flow records to m+1 flow records. Following arrival of the $n^{th}$ available flow record, each flow record (from the union of the two min-priority queues) may be processed in constant time (including an additional O(m) time at the end of the measurement period) in order to identify the m+1 flow records comprising the largest sampling parameters. As such, provided that the time between flow record arrivals has a lower bound of O(1) processing time associated with each flow record, the processing associated with a flow record may be completed prior to the arrival of the subsequent flow record.

As depicted and described with respect to FIG. 15 and FIG. 16, the normalized usage values $u_i$ operate as unbiased individual estimators of respective flow record sizes $x_i$, and estimated total usage $X_{TOT-E}(c)$ operates as an unbiased total estimator of actual total usage $X_{TOT-A}(c)$. In many applications, knowledge of individual estimator reliability and total estimator reliability may be useful. For example, the individual usage estimators and associated total usage estimator may be characterized according to respective variances associated with the estimators. Such characterizations are appropriate for summations of a large number of random variables (i.e., for computing $X_{TOT-E}(c)$) since deviations from the mean for sums of independent (or weakly dependent) random variables, suitably rescaled, follow an asymptotically Gaussian distribution.

This approach of characterizing usage estimators according to variance corresponds well to real-world applications since, in at least one embodiment, it is beneficial to know the accuracy of usage estimates in keys comprising large amounts of information (e.g., keys consuming extensive network resources). In general, usage in a given key may be large if there are flow records with size x larger than the sampling threshold z; however, since such flow records are sampled, the flow records incur no estimation error. Similarly, usage in a given key may be large if there are a large number of flow records with size x smaller than sampling threshold z. In this latter case, however, characterization of accuracy through variance is appropriate.

It should be noted that, since sampling threshold $z_T$ depends on the collection of sampling parameters $z_i$, the selection of flow records under hard resource constraints is correlated. In other words, selection of a given flow record makes the selection of a different flow record less likely (other flow records are selected with lower probability). For example, assuming that two flow records (n=2) compete for one selection slot (m=1), selection of one of the two flow records precludes the selection of the other flow record. It should be noted that for m≧2, the individual usage estimates $u_i$ are uncorrelated (i.e., the mutual covariance of the individual usage estimates is zero). As such, the variance of the estimated total usage is equal to the sum of the variances of the individual usage estimates $u_i$:

$$\text{VAR}(X_E(c)) = \sum_i \text{VAR}(u_i) \quad (12)$$

For example, assume a plurality of data flows comprise a respective plurality of flow records, where each of the flow records corresponds to an Internet Protocol packet. Furthermore, assume that each flow record comprises at least one attribute which, for the purposes of this example, corresponds to packet size measured in bytes. As such, using the methodologies of the present invention, an estimated total usage may be calculated by sampling a subject of the available flow records received. Further assume that five flow records (n=5) are received, of which three flow records (m=3) are sampled according to the present invention. The results of flow record processing associated with the present example are depicted in TABLE 2.

TABLE 2

| Flow Record (i) | Attribute Size ($x_i$) | Random Variable ($w_i$) | Sampling Parameters ($z_i$) | Record Selected | Normalized Usage ($u_i$) |
|---|---|---|---|---|---|
| 1 | 1000 | 0.2 | 5000 | Yes | 1200 ($z_T$) |
| 2 | 200 | 0.8 | 250 | No | — |
| 3 | 800 | 0.4 | 2000 | Yes | 1200 ($z_T$) |
| 4 | 1400 | 0.7 | 2000 | Yes | 1400 ($x_4$) |
| 5 | 480 | 0.4 | 1200 | $z_T$ | — |

As depicted in TABLE 2, the three flow records with the largest sampling parameters $z_i$ are flow records i=1 ($z_1$=5000), i=3 ($z_3$=2000), and i=4 ($z_4$=2000), respectively. Furthermore, the sampling threshold $z_T$ is set to the fourth largest sampling parameter (i.e., $z_T=z_{m+1}=1200$). Using the methodology of the present invention, the maximum function max{$x_i,z_T$} is applied in order to determine the normalized usage for each of those selected flow records. For example, since $z_T > x_1$, normalized usage $u_1$ is computed as $u_1=z_T=1200$. As such, as depicted in TABLE 2, the normalized usages $u_i$ associated with flow records i=1, i=3, and i=4 are 1200 bytes, 1200 bytes, and 1400 bytes, respectively.

In one further embodiment, the estimated total usage associated with the flow is computed by summing the estimated normalized usages $u_i$. Using the normalized usage values from TABLE 2, the estimated total usage $X_{TOT-E}(c)$ is 3800 bytes. The actual total usage $X_{TOT-A}(c)$ of the flow depicted in TABLE 2 is computed by summing the attribute size values ($x_i$) associated with each of the five flow records, resulting in an actual usage equal to 3880 bytes. As such, even an extreme example such as the one depicted in TABLE 2 (using a very small number of flow records, where n=5 and m=3), the methodology of the present invention produces a reliable estimate of the actual usage of the data flow (98% accurate in this example).

In one embodiment, methodologies described with respect to FIG. 14, FIG. 15, and FIG. 16 may be adapted for querying at least one database. In this embodiment, an object may correspond to a database record, and each database record may comprise at least one associated attribute. For example, a database may comprise at least one table of n objects, where each object i comprises at least one key (attribute) of size $x_i$. In particular, a database may comprise a salary table, and each database record within the salary table may comprise associated salary attributes (e.g., employee name, employment state, employee salary, and like salary attributes). In this example, each database record comprises at least one associated attribute (e.g., employee salary), and each attribute comprises a corresponding size $x_i$ (e.g., $40,000 salary).

In one embodiment, an unbiased estimated total usage $X_{TOT-E}(c)$ may be computed using a subset m of available database records n. For example, a query requesting the total salary of all employees located within New Jersey may be satisfied by querying (sampling) a subset of the salary attribute values associated with employees for which the 'state of employment' parameter is New Jersey. In another embodiment, an unbiased estimated average usage may be computed using the estimated total usage (by dividing the estimated total usage by the estimated number of available database records). For example, a query requesting an average salary for employees between the ages of 24 and 30 may be satisfied by querying (sampling) a subset m of the n salary attribute values associated with employees between the ages of 24 and 30.

In one embodiment, querying of databases is performed in a manner substantially similar to the methodology depicted and described with respect to FIG. 15. For example, processing associated with calculation of the sampling parameters, and subsequent selection of m database records for sampling may be performed as each database record meeting the conditions of the query is retrieved from the database. In another embodiment, querying of databases is performed in a manner substantially similar to the methodology depicted and described with respect to FIG. 16. For example, processing associated with calculation of the sampling parameters may be performed as preprocessing prior to querying of the database. In one further embodiment, the sampling parameters may be stored as a portion of each attribute of each of the respective database records. In one such embodiment, the sampling parameters may be calculated and stored as each new database record is written to the database.

The querying of databases according to the methodologies described above is computationally less expensive than standard methods of querying databases. As such, the methodologies described herein produce unbiased estimates of database record summations in substantially less time than traditional methods of querying databases, and while reducing consumption of database resources required to obtain the requested information. In one embodiment, application of the methodologies of the present invention to database queries may be used to implement arbitrary database selections. As such, a particular query may comprise selection predicates of arbitrary complexity conditioned over an arbitrary number of dimension attributes.

In one embodiment, a database table may be preprocessed such that database records are sorted and stored in order of decreasing priority, where priority is determined according to the respective sampling parameters. In another embodiment, standard database record retrieval methods (e.g., indexing) may be used on any of the database dimensions for efficiently retrieving database records in order of priority. It should be noted that use of more complex database indices (e.g., R-trees) may eliminate a need to store the database records in priority order. Furthermore, use of such database indices enables the simultaneous use of a plurality of object attributes (such as salary, wealth, and cardinality).

In one embodiment, parallel database queries may be supported according to the methodologies of the present invention. For example, maintaining N-sorted subsequences may enable N-wise parallel database queries. In another embodiment, higher priority database records (database records having attributes with greater associated sampling parameters) may be stored in faster memory components in order to improve database record access time. Similarly, higher priority database records may be cached in order to improve database record access time.

In one embodiment, an unbiased estimate of the standard deviation of estimated total usage $X_{TOT-E}(c)$ may be computed. As such, given a target accuracy of the standard deviation of $X_{TOT-E}(c)$, the number of database records m selected for sampling may be adaptively increased such that a sufficiently small estimate of the standard deviation of $X_{TOT-E}(c)$ may be obtained. Similarly, an unbiased estimate of the standard deviation of the estimated average usage may be computed. In one embodiment, an upper bound on the standard error of the estimated total usage (i.e., the standard deviation of the estimated total usage divided by the estimated average usage) may be computed as $1/\sqrt{m-1}$.

Figure 17:
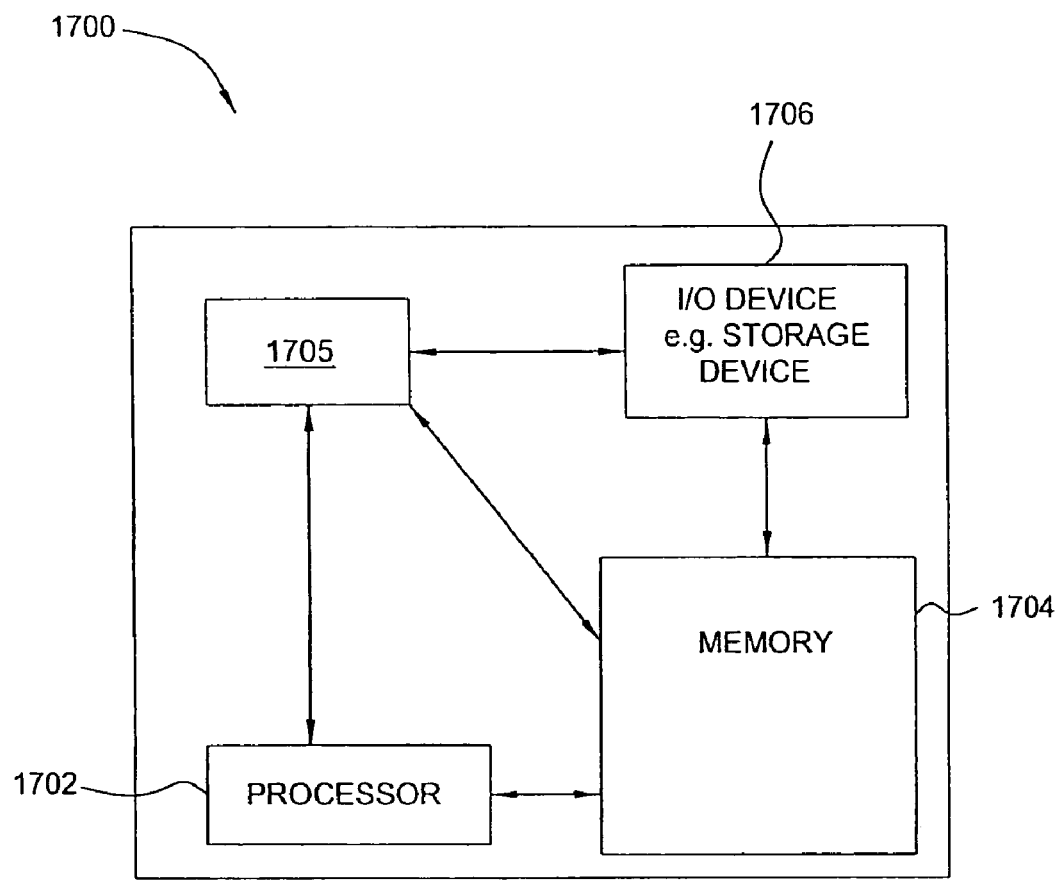
FIG. 17 depicts a high level block diagram of a general purpose computer suitable for use in performing the functions described herein.

FIG. 17 depicts a high level block diagram of a general purpose computer suitable for use in performing the functions described herein. As depicted in FIG. 17, the system 1700 comprises a processor element 1702 (e.g., a CPU), a memory 1704, e.g., random access memory (RAM) and/or read only memory (ROM), an object sampling module 1705, and various input/output devices 1706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the object sampling module or process 1705 can be loaded into memory 1704 and executed by processor 1702 to implement the functions as discussed above. As such, the present object sampling process 1705 (including associated data structures) of the present invention can be stored on a computer readable medium or carrier, e.g., RAM memory, magnetic or optical drive or diskette and the like.

Although described with respect to Internet traffic flow records and database records, it should be noted that the methodologies of the present invention may be utilized for a wide variety of other sampling applications. In one embodiment, for example, the methodologies of the present invention may be utilized for sampling web server usage log records. In this embodiment, the methodologies described herein with respect to querying database records may be applied for retrieving web server usage log records in a substantially similar manner. In another embodiment, for example, the methodologies of the present invention may be utilized for sampling of data objects associated with other communications technologies, such as ATM traffic, FR traffic, and like data.

Furthermore, within each of the potential categories, usage estimates may be computed for a wide variety of possible keys. For example, with respect to Internet traffic, an unbiased usage estimate (total or average) may be computed for the number of packets in a flow, the number of bytes in a flow, and like keys. Similarly, with respect to the category of ATM traffic, unbiased usage estimates may be computed for the number of cells in a flow, the number of bytes in a flow, and like keys.

Although various embodiments which incorporate the teachings of the present invention have been shown and described in detail herein, those skilled in the art can readily devise many other varied embodiments that still incorporate these teachings.

To aid in understanding yet another embodiment of this invention, one should recall that in large IP networks, traffic is commonly measured at multiple points in order that all traffic passes at least one observation point. The resulting measurements are subsequently joined for network analysis. Many network management applications use measured traffic rates (differentiated into classes according to some key) as their input data.

Two factors complicate the analysis. Firstly, traffic is generally represented multiple times in the data. Secondly, the increasing use of sampling during measurement means some classes of traffic may be poorly represented within samples.

In what follows, we show how to combine sampled traffic measurements in way that addresses both of the above issues. We construct traffic rate estimators that combine data from different measurement datasets with minimal or close to minimal variance. This is achieved by robust adaptation to the estimated variance of each constituent. We motivate the method with two applications: estimating the interface-level traffic matrix in a router, and estimating network-level flow rates from measurements taken at multiple routers.

Figure 18:
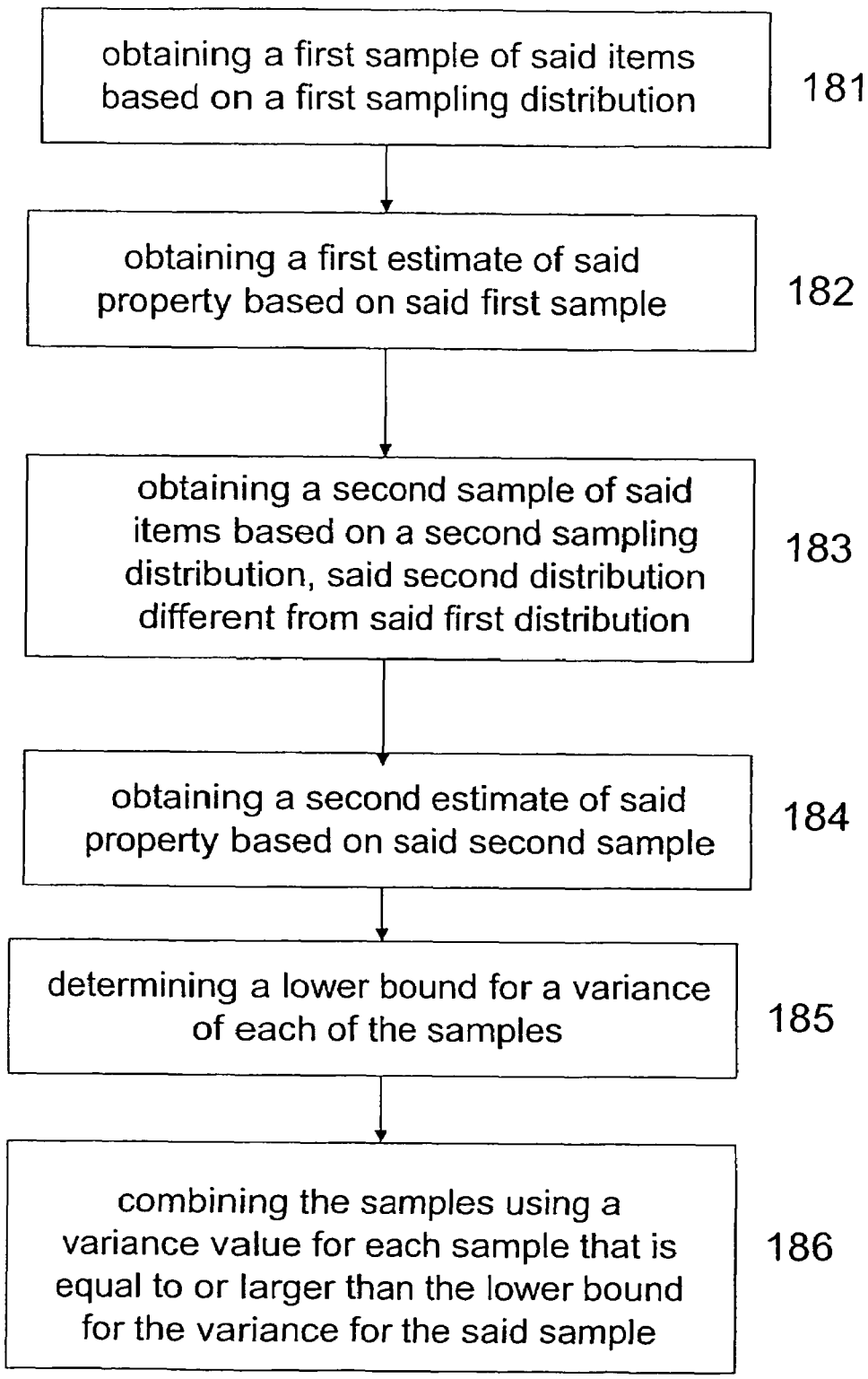
FIG. 18 is a schematic representation of the method of one embodiment of the invention

An embodiment of the inventive method is shown in FIG. 18. In this FIG at 181, a first step involves obtaining a first sample of said items based on a first sampling distribution. Step 182 involves obtaining a first estimate of said property based on said first sample. Step 183 involves obtaining a second sample of said items based on a second sampling distribution, said second distribution different from said first distribution. Step 184 involves obtaining a second estimate of said property based on said second sample. Step 185 determining a lower bound for a variance of each of the samples, and Step 186 involves combining the samples using a variance value for each sample that is equal to or larger than the lower bound for the variance for the said sample.

The increasing speed of network links makes it infeasible to collect complete data on all packets or network flows. This is due to the costs and scale of the resources that would be required to accommodate the data in the measurement infrastructure. These resources are (i) processing cycles at the observation point which are typically scarce in a router; (ii)

bandwidth for transmission to a collector; and (iii) storage capacity and processing cycles for querying and analysis at the collector.

These constraints motivate reduction of the data. Of three classical methods—filtering, aggregation and sampling—the first two require advance knowledge of the traffic features of interest about which information is to be retained. Only sampling allows the retention of subsets of traffic that can be used to field ad hoc queries of the data. Sampling also has the desirable property of being simple to implement and quick to execute, giving it an advantage over recently developed methods for computing compact approximate aggregates such as sketches.

Sampling is used extensively in traffic measurement infrastructures. In sFlow packet samples are sent directly to a collector. In Trajectory Sampling, a given packet is selected either at all points on its path or none, depending on the result of applying a hash function to the packet content. In Sampled NetFlow, packet sampling is used as a front-end to the formation of flow statistics, in order to reduce the speed requirements for flow cache lookup. Several methods have been proposed to focus measurements on the relatively small proportion of longer traffic flows that account for a majority of packets. Some have proposed an adaptive packet sampling scheme for keeping flow statistics in routers which includes a binning scheme to keep track of flows of different lengths. Some sample new flow cache instantiations, thus biasing the collection of flow statistics towards the longer flows. Some keep statistics only on those flows which present successive packets to the router, and uses these to infer statistics of the original traffic. Packet sampling methods are currently being standardized in the Packet Sampling (PSAMP) Working Group of the Internet Engineering Task Force Flow records can themselves be sampled within the measurement infrastructure, either at the collector, or at intermediate staging points. Uniform sampling of flow records suffers from the pathology that estimates of the traffic volumes are highly sensitive to the inclusion or omission of long flows from the sample. To address this problem, it has been proposed to sample flow records with a probability that depends on the number of bytes reported.

In part, our invention is motivated by the need to combine multiple and possibly overlapping samples of network traffic for estimation of the volumes or rates of matrix elements and other traffic components. By a traffic component we mean the maximal set of packets sharing some common property (such a flow key), present in the network during a specified time frame). Network measurements are often taken from multiple observation points in provider networks. Reasons for taking multiple measurements include: to ensure that all traffic of interest passes at least one observation point; to directly measure traffic at a critical set of points of interest; and to directly measure the paths that traffic takes across the network \end{itemize}

In general, the observation points could be different routers, or different interfaces on the same router. Consequently, a given traffic flow may be represented in more than one set of measurements.

For traffic analysis it is often necessary to join the various measurement datasets, while at the same time avoiding multiple counting of the contributions to measurements from multiply observed traffic flows. Sampling the measurements introduces further complexity since quantities defined for the original traffic (e.g. traffic matrix elements) can only be estimated from the samples. Estimation requires both renormalization of numerical quantities such as traffic volumes in order to take account of sampling, and also an understanding of the inherent estimator variability that is introduced through sampling.

Depending on the sampling algorithm used, the proportion traffic sampled from a given traffic component may depend on (i) the sampling rate (e.g. when sampling uniformly) and/or (ii) the proportion of that component in the underlying traffic (e.g. when taking a fixed number of samples from a traffic population). Spatial heterogeneity in traffic rates and link speeds thus presents a challenge for estimating traffic volumes, since a given traffic component may not be well represented in measurements from a given point, and sampling rates may differ systematically across the network. For example, the sampling rate at a lightly loaded access link may be higher than at a heavily loaded core router. Temporal heterogeneity in the sampled proportion can arise from changes in the traffic rates (e.g. due to a network attack, or routing changes) and reconfiguration of sampling parameters in response to these.

In part, our invention addresses the question of how to best to combine multiple estimates of a given traffic component. Our aim is to minimize the variability of the combined estimate. We do this by taking a weighted average of the component estimates that takes account of their variances. Naturally, this approach requires that the variance of each component is known, or can at least be estimated from the measurements themselves. A major challenge in this approach is that inaccurate estimates of the variance of the components can severely impair the accuracy of the combination. We propose robust solutions that adapt to estimated variances while bounding the impact of their inaccuracies.

There are advantages of in our approach of (i) adapting to estimated variances, and (ii) combining multiple estimates as compared to, for example, just using the estimate with lowest variance. The point of adaptation is that the identity of the estimate with lowest variance is generally not known in advance of measurement. The point of combining multiple estimates is that we can gain significant reduction in variance. This will be evident in examples give below, where a number of estimates, none of which is very reliable, are combined to form an estimate with significantly lower variance than any constituent.

The component estimators used in one aspect of this invention are aggregates built by summing individual measurements, for example, those derived from single packets or flows. The variance of each individual measurement can be estimated provided the sampling parameters in force at the time of measurement are known. This is generally possible since the sampling parameters are commonly reported along with the individual measurements, e.g., in Cisco Sampled NetFlow. As individual measurements are aggregated, the corresponding estimated variance is additive. This follows from a subtle but important point: we treat the underlying traffic as a single fixed sample path rather than a statistical process. The only variance is due to sampling, which can be implemented to be independent over each packet or flow record. Consequently, variance estimates can be aggregated along with the estimates themselves, even if the underlying sampling parameters change during the period of aggregation.

We now describe two scenarios in which multiple overlapping traffic measurement datasets are produced, in which our methodology can be usefully applied. We also mention a potential third application, although we do not pursue it in this paper.

Consider a router equipped, as usual, with multiple network interfaces. For network management applications such as traffic engineering, one is often interested in determining traffic matrices, either between ingress-egress interface pairs, or at finer spatial scales, e.g., at the routing prefix level or subnet level matrices for traffic forwarded through a given ingress-egress interface pair.

It is important to emphasize that the number of possible matrix elements of interest can be truly enormous. Consider the set of possible matrix elements between pairs of the roughly $10^5$ internet routing prefixes. It is infeasible simply to maintain a counter for each possible matrix element. And to do so would be wasteful, since not all pairs would exchange traffic through a given router, and of those that could, not all will. Instead the approach used widely is to measure traffic at the router, which then transmits reports (e.g. in the form of flow summary records such as NetFlow statistics) to a remote collector. At the collector, the matrix elements are calculated from the stream of reports. Although the experiments reported on below deal with estimating interface level traffic matrices, the necessity for the basic architecture just described for estimating matrix elements at a general finer granularity should be borne in mind.

When traffic is sampled, the set of observation points used within the router can have a great effect on the accuracy of estimated traffic matrices. Consider the following alternatives: 1) Router-level Sampling. All traffic incident at the router is treated as a single stream to be sampled. We assume ingress and egress interface can be attributed to the measure traffic, e.g., as reported by NetFlow. 2) Unidirectional Interface-level Sampling: traffic is sampled independently in one direction (incoming or outgoing) of each interface. 3) Bidirectional Interface-level Sampling: traffic is sampled independently in both directions of each interface.

A crucial requirement for getting accurate estimates of a matrix element is to have a sufficiently large sample of flows from it. For example, with uniform sampling with probability p, the relative standard deviation for unbiased estimation of the total bytes of n flows behaves roughly as $\approx \sqrt{np}$. Although in general we will consider sampling schemes where the sampling probability $p_i$ of flow i can depend on its size $x_i$, the same qualitative behavior holds.

We propose two classes of important matrix elements: 1) Large matrix elements: those that form a significant proportion of the total traffic through the router 2) Relatively large matrix elements: those that form a significant proportion of the traffic on either or both of their ingress or egress router interface.

We will use the terms small and relatively small in an obvious way. As a specific example, suppose that matrix elements are described by a gravity model in which the matrix element m from interface x to interface y is proportional to $M^{in}_x M^{out}_y$ where $M^{in}$ and $M^{out}$ denote the interface input and output totals. Then the large matrix elements $M_{xy}$ are those for which both $M^{in}_x$ and $M^{out}_y$ are large. The relatively large matrix elements are those for which either $M^{in}_x$ or $M^{out}_y$ (or both) are large.

Router level sampling is effective for estimating large matrix elements, but not matrix elements that are relatively large but only small at the router level. This is because flows are sampled at a rate that does not depend on the identity of their ingress and egress interfaces. In the gravity model, router sampling is good for estimating the "large-to-large" matrix elements, (i.e. those $M_{xy}$ for which both $M^{in}_x$ and $M^{out}_y$ are large) but not so good for estimating "large-to-small" and "small-to-large" (or the "small-to-small") matrix elements.

Unidirectional interface-level sampling offers some improvement, since one can use a higher sampling rate on interfaces that carry less traffic. However, unidirectional sampling, say on the ingress direction, will not help in getting sufficient samples from a small interface-to-interface traffic matrix element whose ingress is on an interface that carries a high volume of traffic. In the gravity model, "large-to-small" (and "small-to-small") matrix elements would be problematic with ingress sampling.

Only bidirectional interface-level sampling allows us to obtain a representative sample of small but relatively large matrix elements. We can form two different estimates of the matrix elements, one by selecting from an ingress interface all samples destined for a given egress interface, and one by selecting from an egress interface all samples from a given input interface. The two estimates are then combined using the method proposed in this paper. In the gravity model, this enhances the ability to estimate "small-to-large" and "large-to-small" matrix elements.

The extent to which router or interface level sampling are effective for estimating large or relatively large matrix elements depends on the sampling rates employed and/or the resources available for storing the samples in each case. If router level and interface level sampling are employed, then three estimates (from router, ingress and egress sampling) can be combined. We emphasize that in both the three-way and two-way combinations, we require no prior knowledge of sampling parameters or the sizes of the matrix elements or their sizes relative to the traffic streams from which they are sampled.

The total number of samples taken is a direct measure of the memory resources used in sampling. We envisage two realization for which our analysis is useful. Firstly, for router based resources, the question is how to allocate a given amount of total router memory between router based and interface based sampling. This division may be virtual or physical, i.e, one has to decide how much memory to build into interface cards. The second realization is for data collection and analysis. Although storage is far cheaper than in the router case, there is still a premium on query execution speed. Sampling records reduce query execution time. So the question becomes how many samples of each type (interface or router) should be taken to form estimates.

The second setting for our methods is combining measurements taken at multiple routers across a network. Multiple observation points are needed in order that all traffic passes at least one point.

One approach is to measure at all edge interfaces, i.e., access routers and peering points. Thus, except for traffic destined to routers themselves, traffic is sampled at both ingress and egress to the network. Estimating traffic matrices between edges is then analogous to the problem of estimating ingress-egress matrix elements in a single router from bidirectional interface samples.

Once measurement and packet sampling capabilities become standardized through the PSAMP and Internet Protocol Flow Information eXport (IPFIX) Working Groups of the the IETF, it is expected that measurements will be ubiquitously available across network routers. In this case, each traffic flow would potentially be represented in all routers on its network path. With today's path lengths, this might entail up to 30 routers. However, control of the total volume of data traffic may militate that the sampling rate at each location be quite low, and hence the estimates formed from its sample alone be quite noisy. The problem for analysis then becomes how to combine these noisy estimates to form a reliable one.

Multiple sampling methods can operate at an observation point in order to service different applications. A specific case is the sampling of flow records. The choice of sampling method depends on the traffic characteristics which are to be estimated and the underlying statistical features of the traffic.

For example, the distribution of bytes and packet per flow has been found to be heavy-tailed. For this reason, sampling with a non-uniform probability that is higher for longer flows leads to more accurate estimation of the total traffic bytes than uniform sampling. On the other hand, estimates of the number of flows are more accurate with uniform sampling. For this reason it is possible that multiple parallel sampling methods will be applied to the same traffic. Nevertheless, when multiple samples are taken, it is desirable to use all samples at ones disposal for estimation, since combining estimates may reduce variance.

In what follows, we describe our basic model for traffic sampling, and then we describe a class of minimum variance convex combination estimators. The pathologies that arise when using these with estimated variance are discussed. We then define and justify the two regularized estimators that we propose in order to avoid these pathologies. Thereafter, we recapitulate two closely related sample designs for size dependent sampling of flow records, and apply the general form of the regularized estimators discussed in each case. We then discuss experimental evaluation of the regularized size-dependent estimators for combining samples of flow records. We then evaluate the performance of the regularized estimators in the router interface-level traffic matrix estimation problem discussed above and demonstrate the benefits of including interface-level samples in the combination. We then evaluate performance of the regularized estimators in the network matrix estimation problem discussed above and show how they provide a robust combination estimates under wide spatial variation in the underlying sampling rate.

We start with a set of n traffic flows labeled by $i=1, 2 \ldots n$, whose byte sizes are $x_i$. We wish to estimate their total bytes $$X = \sum_{i=1}^{n} x_i.$$

Each flow i can be sampled at one of m observation points, giving rise to estimators $\hat{X}_1 \ldots \hat{X}_m$ as follows. Let $p_{ij}>0$ be the probability that flow i is selected at observation point j. In general $p_{ij}$ will be a function of the size $x_i$, while its dependence on j reflects the possible inhomogeneity of sampling parameters across routers.

Let $\chi_{ij}$ be the indicator of selection, i.e., $\chi_{ij}$ takes the value 1 when the flow i is selected in measurement j, and 0 otherwise. Then each $\hat{x}_{ij} = \chi_{ij} x_i/p_{ij}$ is an unbiased estimator of $x_i$, i.e., $E[\hat{x}_{ij}]=x_i$ for all measurements j. Put another way, if flow i is selected in measurement j then its size is estimated by $x_i/p_{ij}$. In this estimate, the renormalization by $p_{ij}$ compensates for the fact that the flow may not be selected. It follows that for each j, $$\hat{X}_j = \sum_{i=1}^{n} \hat{x}_{ij}$$

is an unbiased estimator of X.

We emphasize that the $x_i$ are considered fixed (deterministic) quantities, so the randomness in the $\hat{X}_{ij}$ arises only from sampling. We assume that the sampling decisions (the $x_{ij}$) for each flow i at each of the m observation points are independent; it follows that the $\hat{X}_m$ are independent.

In order to use all the information at our disposal concerning X, we form estimators of X that depend jointly on the m estimators $\hat{X}_1, \ldots \hat{X}_m$. One widely used class of estimators are the maximum likelihood estimators; however we found that these are computationally prohibitively complex when applied to the present model. Instead we focused on convex combinations of the $\hat{X}_j$, i.e., estimators of the form shown in FIG. 19, equation 1, where $\lambda j \epsilon [0,1]$ and $$\sum_{j=1}^{m} \lambda j = 1.$$

In general, we allow the coefficients $\lambda j$ to be random variables than can depend on the $\hat{x}_{ij}$. We will find that this class of models is reasonably amenable to analysis, and the statistical properties of its members are relatively easy to understand.

Each choice of the coefficients $\lambda = \{\lambda j: j=1, \ldots, m\}$ gives rise to an estimator $\hat{X}$. Which should be used? To evaluate the statistical properties of the estimators in FIG. 19A, equation 1, we focus on two properties: estimator bias and estimator variance. We now describe these for several cases of the estimator in FIG. 19A, equation 1. Let $v_j$ denote the variance Var ($\hat{X}_j$) as shown in FIG. 19A, equation 2.

Here, $\lambda j=1/m$ hence $$\hat{X} = m^{-1} \sum_{j=1}^{m} \hat{X}_j.$$

This estimator is unbiased since the $\lambda j$ are independent:

$$E[\hat{X}] = \sum_{j=1}^{m} \lambda j E[\hat{X}_j] = X.$$

It has variance $$Var(X) = m^{-2} \sum_{j=1}^{m} v_j.$$

This estimator is very simple to compute. However, it suffers from sensitivity of Var($\hat{X}$) to one constituent estimator $\hat{X}_j$ having large variance $v_j$, due to. e.g., a small sampling rate. The average estimator is special case of the following class of estimator.

When $\lambda j$ is independent of $\hat{X}_j$, $\hat{X}$ is unbiased, as shown in FIG. 19A, equation 3. Furthermore, elementary algebra yields equation 4 in FIG. 19A. The RHS of equation 4 can be rewritten as equation 5 in FIG. 19A where elements of this equation are given in FIG. 19A equation 6. Equation 5 shows that the variance of $\hat{X}$ is minimized by minimizing the total mean square error in estimating the $\Lambda_j$ by $\lambda_j$. Then $V_0(v)$ is the minimum variance that can be attained. The form of $\Lambda_j$ says that the more reliable estimates, i.e., those with smaller variance, have a greater impact on the final estimator.

When the variances $v_j$ are known, the Var($\hat{X}$) is minimized by equation 7 of FIG. 19A. We emphasize that in general, we do not expect the $v_i$ will be known a priori. For general $p_{ij}$ it is necessary to know all $x_i$ in order to determine $v_i$. However, in many applications, only the sizes $x_i$ of those flows actually selected during sampling will be known. We now mention two special cases in which the variance is at least implicitly known.

Assume that each flow is sampled with the same probability at each observation point, although different flows may have different sampling probabilities. Thus for some $p_i$, $p_{ij}=p_i$ for all j. Then the $v_i$ are equal and we take $\lambda j = \Lambda j(v) = 1/m$. Hence for homogeneous sampling, the average estimator from above is the minimum variance convex combination of the $\hat{X}_j$.

Assume that flows are sampled uniformly at each observation point, although the sampling probability may vary between points. Thus for some $q_j$, $p_{ij}=q_{ij}$ for all i. Then $$v_j = \left(\sum_{i=1}^{n} x_i^2\right) u_j$$

where $u_j=(1-q_j)/q_j$. The dependence of each $v_j$ in the $\{x_i\}$ is a common multiplier which cancels out upon taking the minimum variance convex combination $\hat{X}$ using equation 8 of FIG. 19A When variances are not known a priori, they may sometimes be estimated from the data. For each observation point j, and each flow i, the random quantity, given by equation 9 of FIG. 19B, is an unbiased estimator of the variance $v_{ij}=\text{Var}(\hat{x}_{ij})$ in estimating $x_i$ by $\hat{x}_{ij}$. Hence the sum given by FIG. 19B, equation 10, is an unbiased estimator of $v_j$. Put another way, we add an amount $x^2_i(1-p_{ij})/p2_{ij}$ to the estimator $\hat{V}_j$ whenever flow i is selected at observation point j.

Note that $\hat{V}_j$ and $\hat{X}_j$ are dependent. This takes us out of the class of estimators with independent $\{\lambda_j\}$ and $\{\hat{X}_j\}$, and there is no general simple form for the $\text{Var}(\hat{X})$ analogous to equation 4. An alternative is to estimate the variance from an independent set of samples at each observation point j. This amounts to replacing $\hat{\chi}_{ij}$ by an independent identically distributed sampling indicator $\{\hat{\chi}_{ij}'\}$ in equation 9. With this change, we know from above that using equation 11 of FIG. 19B will result in an unbiased estimator $\hat{X}$ in equation 1. But the estimator will not in general have minimum possible variance $V_0(v)$ since $\lambda_j$ is not necessarily an unbiased estimator of $\Lambda_j(v)$.

A problem with estimated variances is that they may be zero in some cases. On the other hand, we have seen that using the average estimator is susceptible to the effect of high variances. In response, one is tempted to consider some ad hoc approaches, such as: AH1) Use $\lambda_j=\Lambda_j(V)$ on the subset of sample sets j with non-zero estimated variance. If all estimated variances are zero, use the average estimator. Or AH2) Use the non-zero estimate of smallest estimated variance. But these estimators still suffer from a potentially far more serious pitfall: the impact of statistical fluctuations in small estimated variances. This is discussed further below.

We have seen above that the average estimator is the minimum variance convex combination only when sampling is homogeneous across observation points. We also say above that we can form a minimum variance estimator without direct knowledge of estimator variance only when sampling is uniform. In practice, we expect neither of these conditions to hold for network flow measurements.

Firstly, sampling rates are likely to vary according to monitored link speed, and may be dynamically altered in response to changes in traffic load, such as those generated by rerouting or during network attacks. For example, in one proposal, the sampling rate may be routinely changed on short time scales during measurement, while the emerging PSAMP standard is designed to facilitate automated reconfiguration of sampling rates.

Secondly, the recognition of the concentration of traffic in heavy flows has led to the development of sampling schemes in which the sampling probability of a flow (either of the packets that constitute it, or the complete flow records), depends on the flow's byte size rather than being uniform.

Finally, in some sampling schemes, the effective sampling rate for an item is a random quantity that depends on the whole set of items from which it is sampled, and hence varies when different sets are sampled from; priority sampling as discussed above is an example.

Using estimated variances brings serious pitfalls. The most problematic of these is that samples taken with a low sampling rate may have estimate variance close to or even equal to zero. Even if the zero case is excluded in ad hoc manner, e.g. as described in above, small and unreliable sample may spuriously dominate the estimate because its estimated variance happens to be small. Clearly some form of regularization is required in order to alleviate this problem. A secondary issue for independent variance estimation is the requirement to maintain a second set of samples. This doubles the resources required for selecting, transmitting and storing the measurements.

In what follows, we propose a regularization for variance estimation in a recently proposed flow sampling scheme that controls the effect of small estimated variances, even in the dependent case.

We propose two construct convex combination estimators of the type shown in equation 1 using random coefficients $\{\lambda_j\}$ of the form shown in equation 11 but regularizing or bounding the variances to control the impact of small estimated variances. Both estimators take the form $$\sum_j \lambda_j \hat{X}_j$$

with $\lambda_j=\Lambda_j(\hat{U})$ for some estimated variances $\hat{U}$ while they differ in which $\hat{U}$ is used.

Both estimators are characterized by the set of quantities $\tau$, where for each observation point j $\tau_j$ is given by FIG. 19B, equation 12. The $\tau_j$ may be known a priori from a given functional dependence of $p_{ij}$ on $x_j$, or it may only be known from the measurements themselves.

The first estimator ameliorates the impact of small underestimated variances, while still allowing combination to take account of divergent but well-estimated variances. Note that the estimated variance $\hat{v}_{ij}$ obeys the bound given by FIG. 19B, equation 13. This suggests that we can ameliorate the effects of random exclusion of a flow from the sample by adding a small multiple s of $\tau^2_j$ to each variance estimator $\hat{V}_j$. This represents the likely uncertainty in variance estimation. The addition has little effect when the estimated variance arises from a large number of samples, but tempers the effect of a small sample for which the variance happens to be small or even zero. With this motivation, the regularized variance estimator is $$\hat{X} = \sum_j \lambda_j \hat{X}_j$$

with the elements given by FIG. 19B, equation 14. The corresponding variance estimate for this convex combination is $$\hat{V} = \sum_{j=1}^{m} \lambda_j^2 \hat{V}_j.$$

The second estimator uses a similar approach on the actual variance $v_{ij}$, which obeys the bound give by FIG. 19B, equation 15. If this bound were equality, we would then have $V_j = X\tau_j$ in which case, the minimum variance estimator would be the bounded variance estimator, namely, $$\hat{X} = \sum_j \lambda j \hat{X} j$$

with $\lambda j = \Lambda j(X\tau) = \Lambda(\underline{\tau})$. The corresponding variance estimate for this convex combination is $$\hat{V} = \sum \lambda_j^2 \hat{V}_j.$$

The strength of this approach is that the variance estimate can take account of knowledge of inhomogeneity in the sample rates (as reflected by inhomogeneity in the $\tau_j$) while not being subject to statistical fluctuations in variance estimates.

Note that uniform and homogeneous sampling fall into this framework already (with equality in equation 15), since in both cases the dependence of the variances $v_j$ on the objects $x_i$ be sampled is a common factor over all observation points j, which is hence eliminated from the coefficients $\lambda_j$.

The tightness of the bound in equation 15 depends on the functional form of $p_{ij}$. One particular case is when sampling probabilities are small. For this case we propose a linear approximation given by FIG. 19B, equation 16. This yields approximate equality in equation 15, provided all $x_i$ are small compared with $\lambda_j$. We give an example of a sample design with this property below.

We form approximate conservative confidence intervals for $\hat{X}$ by applying a regularization of the type given in equation 14. Thus the upper and lower confidence intervals are given by FIG. 19C, equation 17.

In what follows, we will focus on two closely related schemes for sampling completed flow records. These are threshold sampling and priority sampling. We briefly recapitulate them below For a threshold $z > 0$, a flow of size x is sampled with probability $p_z(x) = \min\{1, x/z\}$. Thus flows of size $x \geq z$ are always sampled, while flows of size $x < z$ are sampled with probability proportional to their size. This alleviates the problem of uniform sampling, that byte estimation can have enormous variance due to random selection or omission of large flows. In threshold sampling, all flows of size at least z are always selected.

Starting with a set of flows with sizes $\{x_j\}$ as before, we form an unbiased estimator $$\hat{X} \text{ of } \sum_{i=1}^{2} x_i$$

using the selection probabilities $p_i = p_z(x_i)$ The estimator of X from a single observation point takes the specific form $\hat{X}$ given by FIG. 19C, equation 18.

Threshold sampling can be shown to be optimal in the sense that it minimizes the cost $C_z = \text{Var}(\hat{X}) + z^2 N$ where $$N = \sum_{i=1}^{n} p_i$$

is the expected number of samples taken. This cost expresses the balance between the opposing goals of reducing the number of samples taken, and reducing the uncertainty in estimating X. The value of z determines the relative importance attached to these goals.

Applying the general formula given by equation 2, the variance of the estimate $\hat{X}$ from a single observation point is given by FIG. 19C, equation 1 which has an unbiased estimator is given by FIG. 19C, equation 20.

In threshold sampling, inhomogeneity across observation points arises through inhomogeneity of the threshold z.

Priority sampling provides a way to randomly select exactly k of the n flows, weighted by flow bytes, and then form an unbiased estimator of the total bytes X. The algorithm is as follows. For each flow i, we generate a random number $\alpha$ uniformly distributed in $(0,1]$, and construct its priorities $\hat{z}_i = x_i \alpha_i$. We select the k flows of highest priority. Let $\hat{z}'$ denote the $(k+1)^{st}$ highest priority. At a single observation point, the estimate of the total bytes x is given by FIG. 19C, equation 21. Here x is the indicator that flow i is amongst the k flows selected. It has been shown that the estimator $\hat{x}$ is unbiased.

For priority sampling, the variance of $\hat{X}$ takes a similar form to that of threshold sampling and is given by FIG. 19C, equation 22, which has unbiased estimator given by FIG. 19C, equation 23. Although sampling of flows is dependent, it turns out, miraculously, that the unbiased estimates $\hat{x}_i = x_i \max\{\hat{z}, x_i\}$ of the bytes of different flows have zero covariance.

In priority sampling, inhomogeneity of sampling between observation points arises not only through inhomogeneity of the number of flows k selected, but also through the background traffic. Typically we want to estimate the total bytes not of all sampled flows, but only of a selection of them that share some property of interest, e.g., a specific source and destination. The probability that a given interesting flow will be amongst the k flows selected, depends also on the sizes of all flows in the background traffic, which generally varies between different observation points. This subtlety does not arise in threshold sampling since threshold flow sampling is independent between flows.

The estimator given by equation 21 appears quite similar to that for threshold sampling given by equation 18, except that the role of the threshold z is played by the random quantity $\hat{z}'$. In fact, the relationship is deeper: one can show that, conditioned on the threshold $\hat{z}'$, the selection probabilities for each flow minimize and analogous cost to $C_z$.

For applications, we see that threshold sampling is well suited to streaming applications when buffer space is expensive (e.g., at a router) since each object is sampled independently. Priority sampling is able to constrain the number of sampled taken, at the cost of maintaining a buffer of k candidate samples during selection. It is well suited to applications where buffering is less expensive (e.g., in a data aggregator or database)

Both size-dependent sampling algorithms give rise to regularized estimators as described above. Consider first threshold sampling and let $z_j$ be the sampling threshold in force at observation point j. Then the quantity $\tau_j$ in equation 12 is just $z_j$. Moreover, $p_{ij}$ is approximately linear in $x_i$, the sense of equation 16, and hence the bounded variance estimator is expected to perform reasonably for flows whose size $x_i$ are small compared with the $z_j$. For priority sampling, we use the random thresholds $z'_j$; in place of the $z_j$.

Implicit in the motivation behind our work is that there are practical circumstances in which no single sample set is uniformly better that others for estimation purposes; combining samples sets is more effective. In this section we demonstrate the value of the approach in estimating the interface-to-interface matrix elements at a router. As discussed above, a challenge is to accurately estimate a range of matrix elements, including not only the largest ones across the whole router, but also the largest amongst those seen at each interface.

Interface level sampling offers the opportunity to capture small traffic matrix elements that would be lost in the background if only router level sampling were to be performed. This is particularly important for a method such as priority sampling in which only a fixed number of samples are taken in a given time period, in order to provide a hard constraint on the use of measurement resources. Smaller matrix elements, which may form a significant proportion of traffic on a lightly used or lower rate interface, may not survive sampling at the router level. There is a trade-off: if all resources were deployed for interface sampling, then not all larger flows on some heavily used interfaces would be sampled. As mentioned above, the memory resources considered here may be those at the measuring router itself, or in the database in which flow records are collected.

This motivates using a combined estimator. In this application we explicitly want to take account of estimated variance, so we use then regularized variance estimator above. In experiments using real flow data taken at two routers, we find that: 1) For a given total number of samples, the regularized estimator is more accurate than its individual consistent estimators or averages thereof and 2) The regularized estimator is more accurate than the ad hoc estimator AH1 when estimation error is large.

The data from this experiment comprised sampled Net-Flow records gathered from two routers in major ISP network. NetFlow records contain, amongst other fields, the total bytes recorded for the flow, and the router input and output interfaces traversed by the flow. Thus, it is possible to map each flow onto the appropriate router to router traffic matrix.

Figures 20, 21:
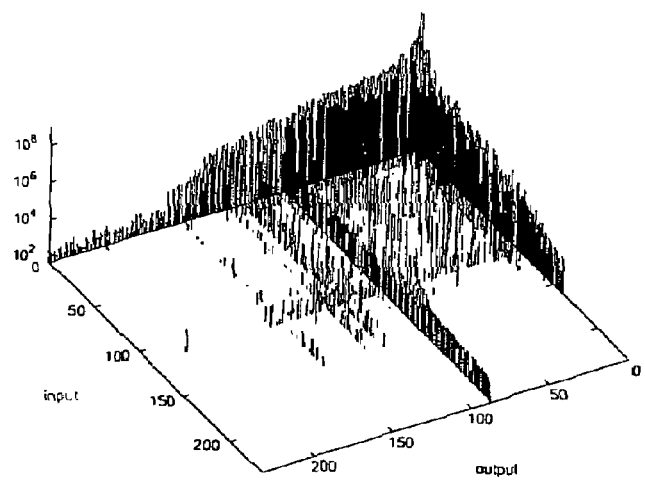
FIG. 20 is a display of matrix elements of Dataset Distribution. In the Figure interfaces are ordered by total bytes.
FIG. 21 is a table of router matrix elements for Campus, with row and column sums, normalized by total bytes.

The first dataset, CAMPUS comprises 16,259,841 Net-Flow records collected during one 24 hour period from a backbone router in a corporate intranet. The flow records had a 30 minute active timeout, with maximum size 3.94 GB and average size 20.4 kB. The router had 8 interfaces. The router matrix elements for a single 10 minute, normalized by total bytes, are shown in FIG. 21. Note the variation in matrix elements, with non-zero matrix elements ranging over six orders of magnitude.

The second dataset, DISTRIBUTION, comprises 1,765, 477 NetFlow records collected during 1 hour from a distribution router in an ISP network. The flow records had a 1 minute active timeout, with maximum flow size 3.97 MB and average 1.4 kB. The router had 236 interfaces (and subinterfaces), whose line rates ranged from 622 MBps (OC-12) down to 1.5 Mbps (T1). Of 55,696 matrix elements, only 1971 are non-zero. We represent these in FIG. 20, where the interfaces have been sorted in decreasing order of total input and output bytes in the 1 hour period. The distribution of traffic per interface is highly skewed: the busiest interface carries 46\% of the bytes, while the 10 busiest carry 94\% of the traffic between them.

In this subsection we consider only priority sampling. We use the following nomenclature: input and output will denote the byte estimators derived from samples taken from input and output interfaces respectively, while router will denote the byte estimator derived from all flows through the router, undifferentiated by interface. average$_{i,o,r}$ denotes the estimator formed as the average of input, output and router, while averaged combines only input and output. adhoc$_{i,o,r}$ combines the estimators input, output and router as described in AH1 above, while regular$_{i,o,r}$ is the corresponding regularized variance estimator from above. bounded is the bounded variance estimator. We will sometimes need to indicate the number of priority samples take, e.g., regular$_{i,o,r}(k_i,k_o,k_r)$ denotes the regularized estimator in which $k_i$ and $k_o$ priority samples were taken at each input and output interface respectively, and $k_r$ were taken at the router level.

We illustrate the relative performance of the various estimators by comparing the byte estimators for several of the matrix elements of CAMPUS from FIG. 2, as a function of the number of priority samples k per interface direction. In this study we used k from the set K={1, 2, 3, 5, 7, 11, 15, 22, 31, 44, 63, 89, 125, 177, 251, 354, 501, 707, 999$\ chosen to give a roughly log-uniform density of values. The estimated matrix elements (normalized through division by the true value) are displayed in FIG. 22. Thus, perfect estimation is represented by the value 1. In this evaluation we selected all flows contributing to a given matrix element, then progressively accumulated the required numbers k of samples from the selection. For this reason, the variation with k is relatively smooth.

There are N=8 interfaces, each with two directions. Each of the single sample estimators was configured using the same number of sample slots: for a given k slots per interface directions, we used input(k), \eoutput$(k)$ and router(2Nk). We first compare these single sample estimators; see FIG. 22. For the smaller matrix elements 8 to 1, 6 to 3 and 6 to 5, input and output are noticeable more accurate that router. This is expected, since the small matrix elements are better sampled at the interface level than at the router level. average$_{i,o,r}$(k,k, 2Nk) performs poorly because of the contribution of router, and also because it driven down by the zero estimation from input\ and output when the number of samples k is small; see e.g. the 8 to 1 matrix element. Only for a large matrix element (2 to 6, constituting about half the traffic in the router) does erouter accuracy exceed the worst of the interface methods. Consequently, the accuracy of average$_{i,o,r}$ is better this case too.

When there are noticeable differences between the three single sample set estimators, regular$_{i,o,r}$(k,k,2Nk) roughly follows the most accurate one. For example: for the 2 to 6 matrix elements, regular$_{i,o,r}$ follows input most closely while in the 6 to 3 and 6 to 5 matrix elements, it follows the output most closely.

We now investigate the behavior of the confidence intervals described above. Recall that each estimation method produced, in addition to the estimated matrix, and estimate of the variance associated with the estimate. This, together with the sampling threshold, is used to form upper and lower confidence intervals in equation 17.

Figure 22:
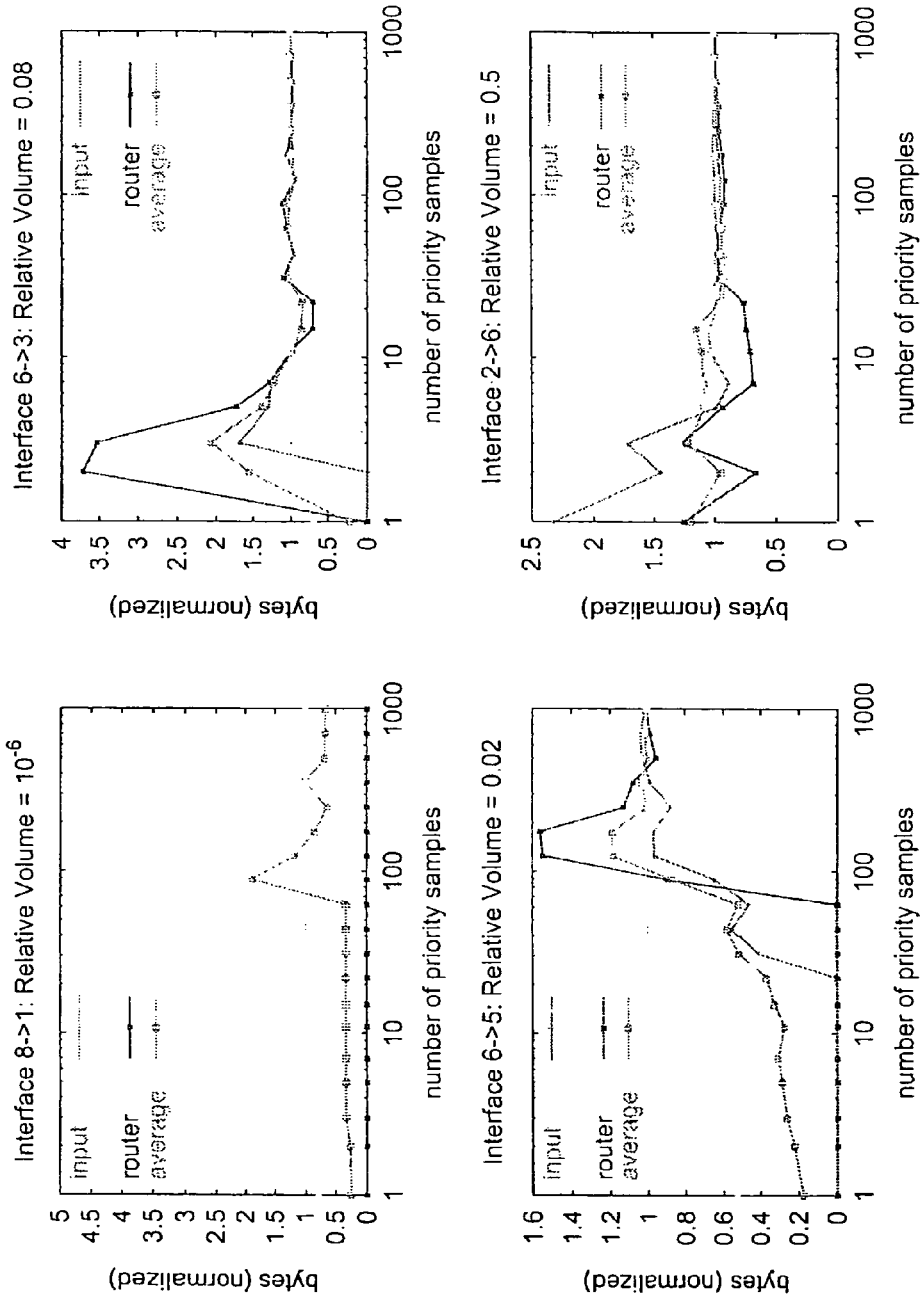
FIG. 22 is an estimator comparison—input, output, router, $\text{average}_{i,o,r}$, and $\text{regular}_{i,o,r}$—for four matrix elements from FIG. 21 representing various relative volumes of total bytes.
Figure 23:
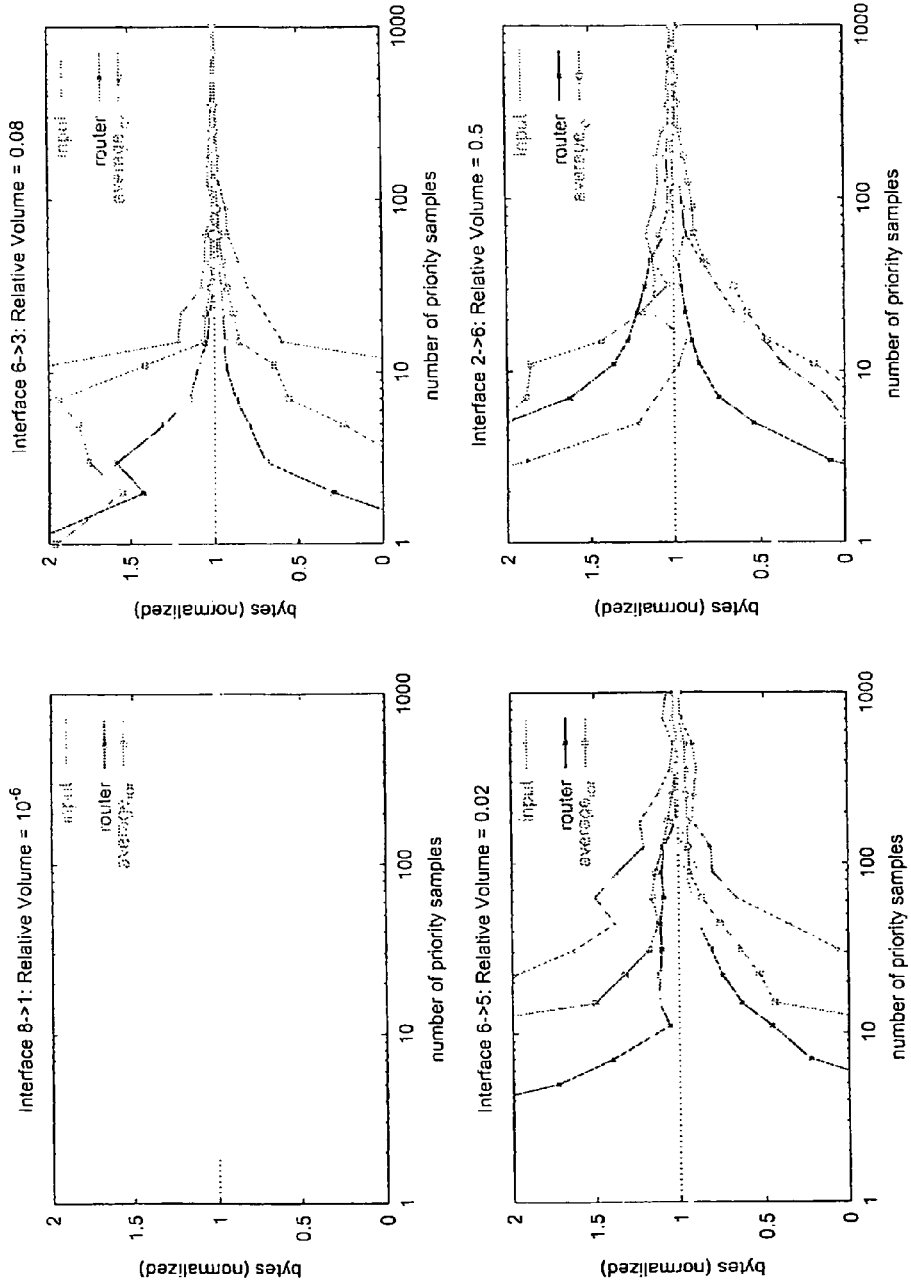
FIG. 23 is a depiction of confidence intervals—input, output, router, $\text{average}_{i,o,r}$, and $\text{regular}_{i,o,r}$—for four matrix elements from FIG. 21

FIG. 23 shows upper and lower confidence limits for estimating the matrix elements of CAMPUS using the same router interfaces as in FIG. 22. These use equation 17 with standard deviation parameter s=2.

First we deal with the special case 8 to 1. Here, k at least two samples, has no estimated error. This is because, as can be seen from FIG. 21, this matrix element is the only one with ingress at interface 8. It has two flows, so once k exceeds 2, the estimated variance and sampling threshold are 0. The other methods perform poorly, since neither output nor router samples this very small flow.

In FIG. 22 we saw that regular$_{i,o,r}$ has the best overall performance, i.e., it tended to have the smallest divergence from the true value. FIG. 23 show that the estimated estimator variance tends to be the smallest too, giving narrow confidence intervals than the other methods.

Now we perform a more detailed comparison of the estimators with the DISTRIBUTION dataset. A given comparison amongst the estimators will use constant total resources. The router has N=236 interfaces, each bidirectional. For a given number k of sampling slots per direction in a router, we compare router(4Nk), input(4k), output(4k), average$_{i,o,r}$(k,k, 2Nk), average$_{i,o,r}$(2k,2k), adhoc$_{i,o,r}$(k,k,2Nk) and regular$_{i,o,r}$ (k,k,2Nk).

The comparison was performed as follows. For a given k, we sorted the relative errors for each matrix element in increasing order, and plotted them as a function of rank. The results are shown in the left hand column of FIG. 24 for k values 16, 128 and 1024. The corresponding average flow sampling rates are approximately 1 in 234, 1 in 30, and 1 in 4 respectively. The curves have the following qualitative features. Moving from left to right, the first feature, present only in some cases, is when the curves start only at some positive rank, indicating all matrix elements up to that rank have been estimated either with zero error, or error smaller that the smallest resolve error, namely, $10^{-5}$. The second feature is a curved portion indicating relative errors smaller than 1. The third feature is a flat portion of relative errors, taking the value 1 for the individual, adhoc$_{i,o,r}$ and regular$_{i,o,r}$ methods, and ½ and ⅓ for average$_{i,o}$ and average$_{i,o,r}$ respectively. This happens when a matrix element has no flows sampled by an estimator (or by one of the constituent estimators in the averaging methods). The final feature at the right hand side are points with relative errors ϵ>1, indicating matrix elements that have been overestimated by a factor ϵ+1.

We make the following observations: 1) Interface sampling (input and output) and regular$_{i,o,r}$ and adhoc$_{i,o,r}$ are uniformly more accurate that average$_{i,o,r}$ or router. 2) Interface sampling appears to perform better than adhoc$_{i,o,r}$ or regular$_{i,o,r}$ when errors are small. This is likely because when the matrix element under study is very well estimated on a given interface, any level information from another interface makes the estimate worse. However, when the best interface has a large estimation error, the additional information can help reduce it: regular$_{i,o,r}$ and adhoc$_{i,o,r}$ become more accurate. 3) The average-based methods perform poorly; we have argued that they are hobbled by the worst performing component. For example, average$_{i,o,r}$ performs worse than input and output since only one of these methods may be accurate for a given matrix element. 4) regular$_{i,o,r}$ and adhoc$_{i,o,r}$ have similar performance, but when there are larger errors, they are worse on average for adhoc$_{i,o,r}$. 5) As expected, estimation accuracy increases with the number of samples k, although average$_{i,o}$ and average$_{i,o,r}$ are less responsive.

Figure 24:
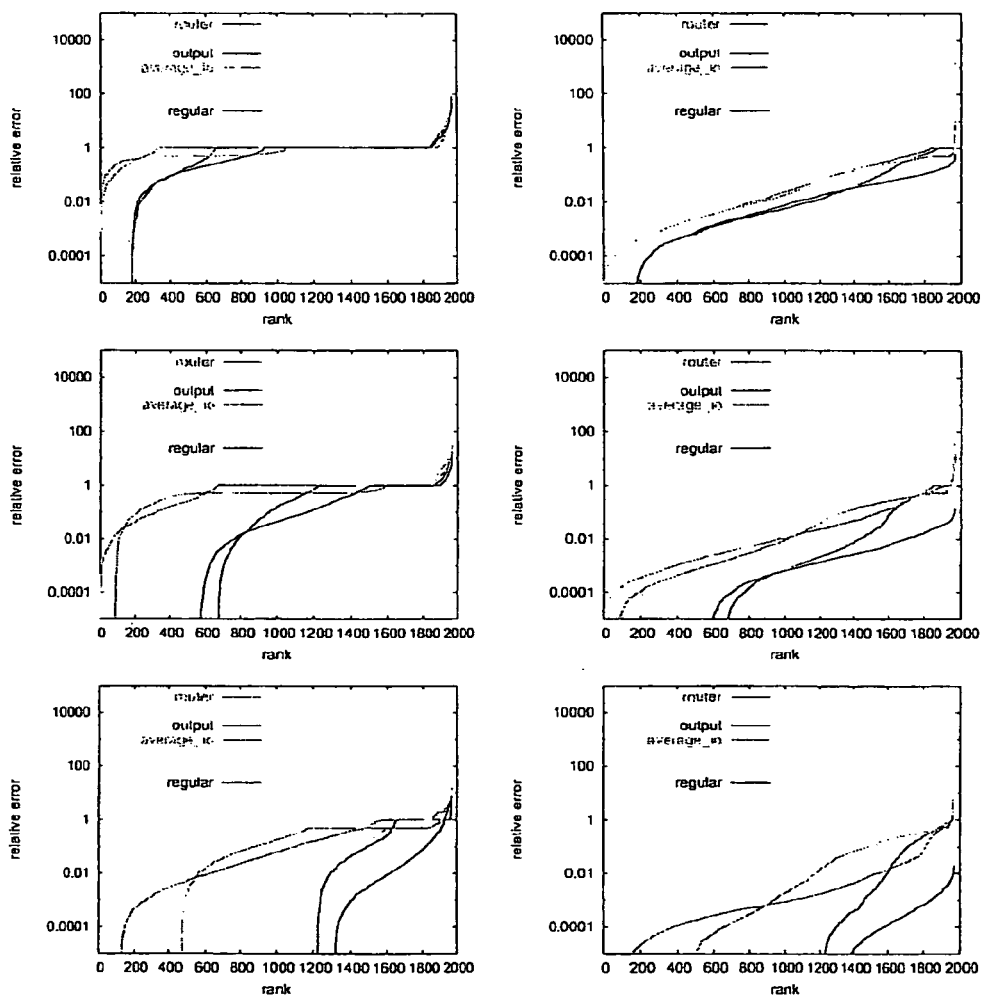
FIG. 24 is a depiction of relative errors of matrix elements for different estimators, ranked by size. Left—raw relative errors. Right—scaled relative errors, Top—16 slots per interface. Middle—128 slots per interface. Bottom—1024 slots per interface. Note for monochrome viewing—$\text{regular}_{i,o,r}$ is represented by lowest dark curve.

FIG. 24 shows results for one sampling experiment. In order to get a broader statistical picture we repeated the experiment 100 times, varying in each repetition the seed for the pseudorandom number generator that governs random selection. We calculated the root mean square (RMS) of the relative errors in estimating each matrix elements and ranked them as before for each estimation method. The curves take broadly the same form as in FIG. 24 but with smoother curves due to averaging over many experiments. We omit the graphs due to space constraints.

Although these graphs show that regular$_{i,o,r}$ and adhoc$_{i,o,r}$ are more accurate than other estimators, is it not immediately evident that this is due to the plausible reasons stated earlier, namely, the more accurate inference of relatively larger flows on smaller interfaces. Also it is not clear the extent to which interface sampling can produce sufficiently accurate estimates at reasonable sampling rates. For example, for k=128 (roughly 1 in 30 sampling of flow records on average) about 25\% of the matrix elements have relative errors 1 or greater. We need to understand which flows are inaccurately estimated.

To better make this attribution we calculate also a scaled version of a matrix elements as follows. Let Q denote the set of interfaces, and let $m_{xy}$ denote the generic matrix element from interface x to interface y. Let $M^{in}$ and $M^{out}$ denote the interface input and output totals, so that $$M_x^{in} = \sum_{y \in Q} m_{xy}$$

and $$M_y^{iout} = \sum_{x \in Q} m_{xy}.$$

If $e_{yx}$ is the relative error in estimating $m_{xy}$, then we write the scale version as given in FIG. 19C, equation 24. In that equation $m_{xy}/M_x^{in}$ and $M_{xy}/M_y^{iout}$ are the fraction of the total traffic that $m_{xy}$ constitutes on it input and output interfaces. Heuristically, $e'_{xy}$ deemphasizes errors on matrix elements which are small relative to the total traffic seen on the both interfaces they cross.

We plot the corresponding ordered values of the errors $e'_{xy}$ in the right hand column of FIG. 24. Note that 1) regular$_{i,o,r}$ and adhoc$_{i,o,r}$ are uniformly more accurate than other methods, except for low sampling rates and low estimation errors, in which case they perform about the same as the best of the other methods; 2) the accuracy advantage of regular$_{i,o,r}$ and adhoc$_{i,o,r}$ becomes more pronounced at larger sampling rates; and 3) regular$_{i,o,r}$ and adhoc$_{i,o,r}$ display neither the third nor fourth features described above, i.e., no flat portion or errors greater than 1. This indicates that these methods are successful in avoiding larger estimation errors for the relatively large matrix elements, while for the other methods some noticeable fraction of the relatively large matrix elements is badly estimated.

Figure 25:
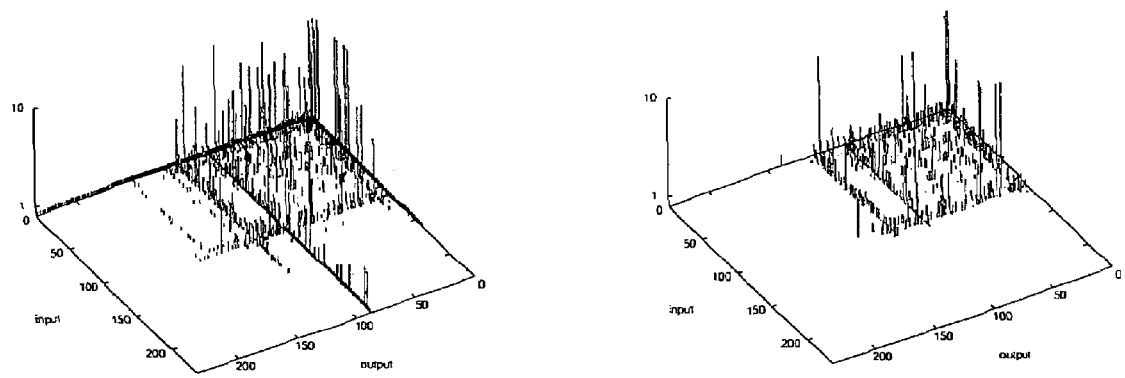
FIG. 25 is a depiction of a matrix of relative errors—k=128 samples per interface direction. Left—$\text{average}_{i,o,r}$. Right—$\text{regular}_{i,o,r}$.

We can also get a picture of the relative performance of methods by looking at the larger estimation errors of the whole traffic matrix. As examples, we show in FIG. 25 unscaled relative errors for k=128 samples per interface direction, for average$_{i,o}$ and regular$_{i,o,r}$. Errors have been truncated at 10 in order to retain detail for smaller errors. Observe that 1) average$_{i,o}$ is poor at estimating many matrix elements through the largest interface (labeled 1) since smaller matrix elements are poorly sampled at that interface. regular$_{i,o,r}$ performs better because it uses primarily the estimates gathered at the other interface employed by such flows; and. 3) regular$_{i,o,r}$ has a smaller number of large relative errors than average$_{i,o}$.

In what follows, we shift the focus to the problem of combining a large number of estimates of a given traffic component. Each estimate may individually be of low quality; the problem is to combine them into a more reliable estimate. As mentioned in above, this problem is motivated by a scenario in which routers or other network elements ubiquitously report traffic measurements. A given traffic component can generate multiple measurements as it transits the network.

A challenge in combining estimates is that they may be formed from sample sets drawn with heterogeneous sampling rates and hence the estimates themselves may have differing and unpredictable accuracy. This can happen for two reasons: 1)\ Spatial Variation: Sampling rates may be configured differently at different interfaces to reflect load, e.g., with higher rates at a low rate access link, but at lower rates in the core. 2) Temporal Variation: Sampling rates may be reconfigured in response to variation in traffic loads, e.g., to reduce the load on the critical measurement infrastructure during network attacks For this reason, the approach above is appealing, since estimation requires no prior knowledge of sampling rates; it only assumes reporting of the sampling rate in force when the sample was taken.

In what follows we report on the combination of multiple estimates taken from a given flow set by threshold sampling. We wished to evaluate the effect of sampling a given stream of traffic at multiple points. We do not have traces taken from multiple locations. Instead, we used the CAMPUS trace, and took multiple independent sets of samples from it, each independent sample set representing measurements taken from a single observation point. We took 30 sample sets in all, based on observations of current maximum typical hop counts in internet paths.

These experiments used threshold sampling. We did not evaluate priority sampling, since this would have necessitated the additional complexity of simulating background traffic for each observation point. Note that apart from packet loss, or the possible effects of routing changes, the multiple independent samples will correspond with those obtained sampling the same traffic stream at multiple points in the network.

Our evaluations comprised multiple experiments, each experiment representing sampling of a different set of flows in the network. The data for each experiment used a successive portion of the campus trace (wrapping around if necessary), and the seed of the pseudorandom number generator used for sampling was changed for each experiment. The estimates based on each set of independent samples were combined using the following methods: AVERAGE, ADHOC, BOUNDED AND REGULAR. Each method was evaluated using the root mean square (RMS) relative estimation error over the multiple experiments as a performance metric. Each of the metrics reported in this section were based in sets of 100 experiments.

To get a baseline for combined estimators, our first experiments report on the case of sampling thresholds uniform at all measurement points. Note in this case that BOUNDED\ reduces to AVERAGE. In separate experiments the sampling threshold took values $10^i$ Bytes for i=3 . . . ,9. This covers roughly the range of flow sizes in the CAMPUS dataset, and hence includes the range of z values that would likely be configured if flow sizes generally conformed to the statistics of \campus. The corresponding sampling rate (i.e. the average proportion of flows that would be selected) with threshold z is $$\pi(z) = \sum_i \min\{1, x_i/z\}/N$$

where $x_j$:1=1 . . . ,N} are the sizes of the N flows in the set. For this dataset $\pi(z)$ ranged from $\pi(10^3)$=0.018 to $\pi(10^9)$=1.9× $10^{-5}$.

Figure 26:
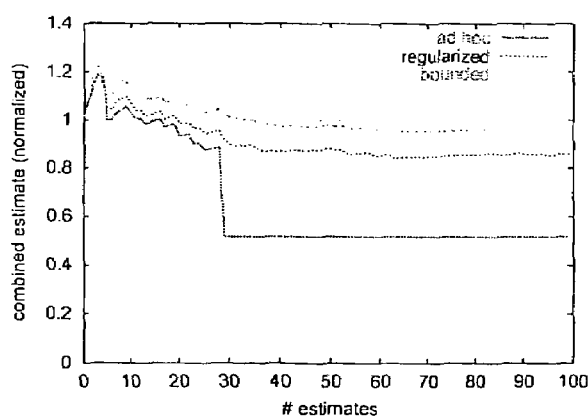
FIG. 26 is a depiction of combined estimators acting cumulatively over 100 independent estimates.
Figure 31:
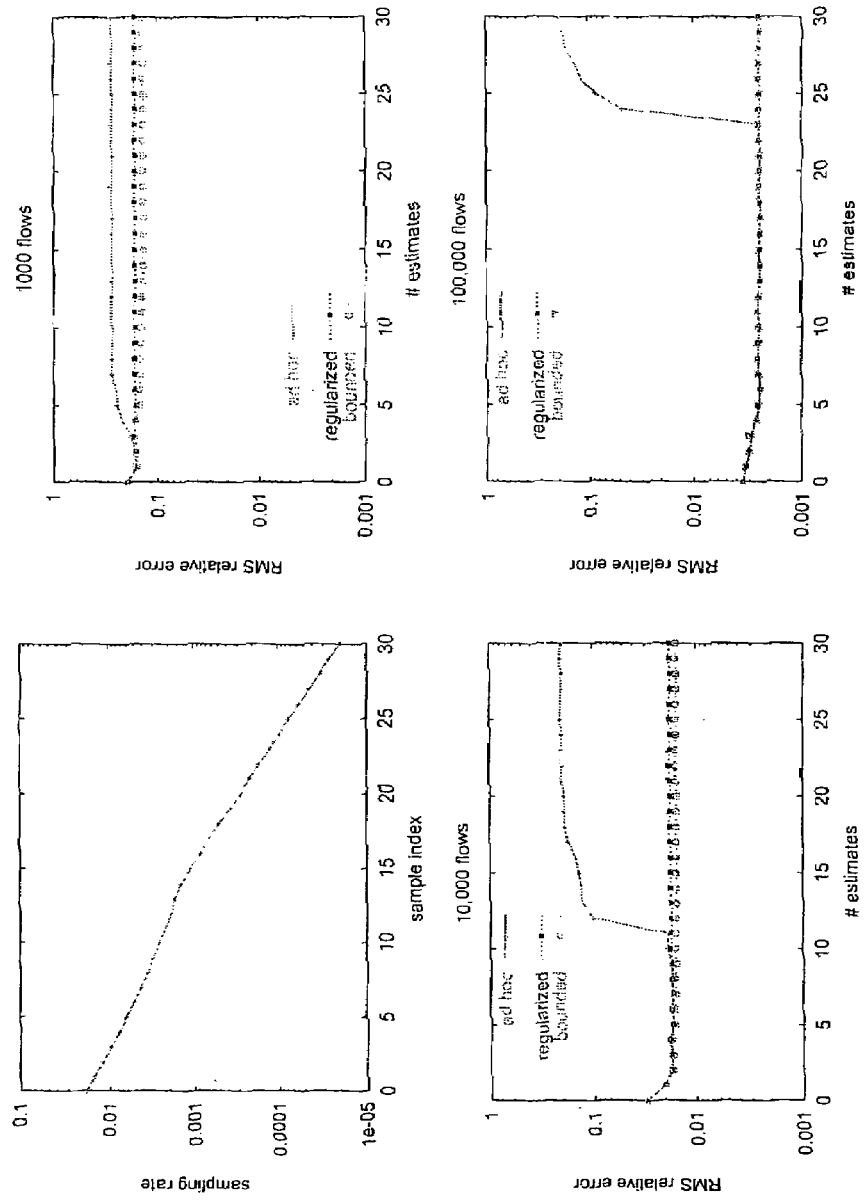
FIG. 31 is a depiction of heterogeneous sampling rates. RMS relative errors for adhoc, average, regular and bounded, as a function of number of estimates combined.

We show a single typical path for a single experiment in FIG. 26. Here we display the byte estimates, renormalized by actual usage. This was for 10,000 flows sampled with threshold 10 MB at 100 sites. There were typically a handful of flows sampled at each observation point. Observe how the BOUNDED estimate relaxes slowly towards the true value. REGULAR also follows at a similar rate, but displaying some bias. ADHOC display systematic bias beyond 30 combinations. This bias shows strikingly the need for robust estimation methods of the type proposed herein.

Summary RMS error statistics over multiple experiment are shown in FIGS. 27-29. Here we vary the number of flows in the underlying population (1000 or 100,000) and the number of independent measurement sites (10 or 30). Observe BOUNDED has somewhat better performance than REGULAR, and significantly better performance than ADHOC. The differences are generally more pronounced for 30 sites than for 10, i.e., BOUNDED is able to take the greatest advantage (in accuracy) of the additional information. On the basis of examination of a number of individual experiments of the type reported in FIG. 26, this appears to be due to lower bias in BOUNDED To model heterogeneous sampling rates we used 30 sampling thresholds in a geometric progression from 100 kB to 100 MB, corresponding to average sampling rates of from 0.016 to $8.9 \times 10^{-5}$. This range of z values was chosen to encompass what we expect would be a range of likely operational sampling rates, these being quite small in order to achieve significant reduction in the volume of flow records through sampling.

We arranged the thresholds in increasing order $10^5 B = z_1 \ldots < \ldots < z_i < \ldots < z_{30} = 10^8 B$, and for each m constructed the various combined estimators formed from the m individual estimators obtained from samples drawn using the m lowest thresholds $\{z_i: i=1, \ldots, m\}$. The performance on traffic streams comprising 1000, 10,000 and 10,000 flows is shown in FIG. 30.

Observe that for AVERAGE, the RMS error initially decreases with path length as it combined the estimators of lowest variance. But it eventually increases as it mixes in estimators of higher variance. On the other hand, RMS errors for BOUNDED and REGULAR are essentially decreasing with path length, with BOUNDED having somewhat better accuracy. Note that the minimum RMS errors (over all path lengths) of the three methods are roughly the same. It might be thought that AVERAGE could be adapted to select and include only those estimates with low variance. However, this would require an additional decision about which estimates to include, and the best trade-off between accuracy and path length is not known a priori. On the other hand, BOUNDED AND REGULAR can be used with all available data, even with constituent estimates of high variance, without apparent degradation of accuracy.

As indicated above, this invention is motivated by the need to combine multiple sets of estimators based on multiple independent samples from the same population of network traffic. With known estimator variance, a minimum variance convex combination can be used. However, spatial and temporal variability of sampling parameters mean that variance should be best estimated from the measurements themselves. Pathologies in variance estimation can subvert this procedure if used naively. This paper was devoted to finding robust remedies to these pathologies.

We proposed two regularized estimators that avoided the pathologies associated with variance estimation. The regularized variance estimator adds a contribution to estimated variance representing the likely error, and hence ameliorates the pathologies of estimating small variances while at the same time allowing more reliable estimates to be balanced in the convex combination estimator. The bounded variance estimator employs an upper bound to the variance which avoid estimation pathologies when sampling probabilities are very small.

We applied our methods in two networking estimation problems: estimating interface level traffic matrices in routers, and combining estimates from ubiquitous measurements across a network. We worked in the context of two flow-size dependent sampling algorithms, although our methods apply more generally. Experiments with real flow data showed our robust estimator combination methods to exhibit: \begin{itemize} \item reduction in estimator variance, as compared with individual measurements \item reduction in bias and estimator variance, as compared with simple averaging or some ad hoc combination methods \item application across a wide range of inhomogeneous sampling parameters, without need to preselect data for accuracy. \end{itemize}

It is worth emphasizing that although our experiments focused on size-dependent flow sampling, the basic method can be applied to combining estimates formed by a variety of sampling techniques, e.g., combining mixed estimates formed from uniform and non-uniform sampling of the same population. Further work in progress examines at an analytical level the properties of combined estimators, and yields a deeper understanding of their statistical behavior beyond characterizing only their mean and variance.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of estimating an attribute of objects, comprising:
   a. obtaining a first sample of said objects based on a first sampling distribution;
   b. obtaining a first estimate of said attribute based on said first sample;
   c. obtaining a second sample of said objects based on a second sampling distribution, where said second sampling distribution is different from said first sampling distribution;
   d. obtaining a second estimate of said attribute based on said second sample;
   e. determining a lower bound for a variance based upon each of the first sample and the second sample; and
   f. combining the first sample and the second sample using a variance value for each one of the first sample and the second sample that is equal to or larger than the lower bound for the variance for the first sample and second sample.

2. The method of claim 1 wherein the first and second samples are obtained at different locations.

3. The method of claim 1 wherein the first and second samples are obtained using different sampling algorithms.

4. The method of claim 1 wherein at least one of: said first sampling distribution or said second sampling distribution is obtained using a threshold sampling algorithm.

5. The method of claim 1 wherein at least one of: said first sampling distribution or said second sampling distribution is obtained using a priority sampling algorithm.

6. The method of claim 4 wherein at least one of: said first sampling distribution or said second sampling distribution is obtained using a parameter of the threshold sampling algorithm.

7. The method of claim 6 wherein said parameter is a value of a sampling threshold.

8. The method of claim 1 wherein the lower bound of the variance of each of the first sample and the second sample is obtained using information based on substantially all objects including those outside the first sample and the second sample, respectively.

9. The method of claim 1 wherein the lower bound of the variance of each of the first sample and the second sample is obtained using information based on individual objects that are part of the first sample and the second sample, respectively.

10. The method of claim 2 wherein the first and second samples are obtained at different router interfaces.

11. The method of claim 2 wherein the first and second samples are obtained at different routers.

12. The method of claim 2 wherein the first and second samples are obtained at different network ingress/egress interfaces.

13. The method of claim 1 wherein said objects are packets that traverse a network.

14. The method of claim 13 wherein the said attribute is the size of said packets.

15. A computer readable medium contained stored instructions which when executed on a computer causes the computer to perform a method of estimating an attribute of objects comprising:
   a. obtaining a first sample of said objects based on a first sampling distribution;
   b. obtaining a first estimate of said attribute based on said first sample;
   c. obtaining a second sample of said objects based on a second sampling distribution, where said second sampling distribution is different from said first sampling distribution;
   d. obtaining a second estimate of said attribute based on said second sample;
   e. determining a lower bound for a variance based upon each of the first sample and the second sample; and
   f. combining the first sample and the second sample using a variance value for each one of the first sample and the second sample that is equal to or larger than the lower bound for the variance for the first sample and second sample.

16. The computer readable medium of claim 15 wherein said objects are packets that traverse a network.

17. The computer readable medium of claim 16 wherein said attribute is the size of said packets.

18. The computer readable medium of claim 15 wherein the lower bound of the variance of each of the first sample and the second sample is obtained using information based on substantially all objects including those outside the first sample and the second sample, respectively.

19. The method computer readable medium of claim 15 wherein the lower bound of the variance of each of the first sample and the second sample is obtained using information based on individual objects that are part of the first sample and the second sample, respectively.

* * * * *